United States Patent
Sarkis et al.

(10) Patent No.: US 11,871,266 B2
(45) Date of Patent: Jan. 9, 2024

(54) TRANSPORT BLOCK SIZE DETERMINATION FOR TWO STAGE CONTROL

(71) Applicant: QUALCOMM Incorporated, San Diego, CA (US)

(72) Inventors: Gabi Sarkis, San Diego, CA (US); Shuanshuan Wu, San Diego, CA (US); Kapil Gulati, Belle Mead, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/156,177

(22) Filed: Jan. 22, 2021

(65) Prior Publication Data
US 2021/0258827 A1    Aug. 19, 2021

Related U.S. Application Data

(60) Provisional application No. 62/975,914, filed on Feb. 13, 2020.

(51) Int. Cl.
*H04W 28/06* (2009.01)
*H04L 1/00* (2006.01)
(Continued)

(52) U.S. Cl.
CPC ......... *H04W 28/06* (2013.01); *H04L 1/0006* (2013.01); *H04W 72/53* (2023.01); *H04W 92/18* (2013.01)

(58) Field of Classification Search
CPC . H04W 28/06; H04W 92/18; H04W 72/0493; H04L 1/0006
See application file for complete search history.

(56) References Cited

U.S. PATENT DOCUMENTS

2021/0385804 A1*  12/2021  Ye ................... H04W 72/0406
2022/0303059 A1*  9/2022  Hahn ................ H04L 1/1812

OTHER PUBLICATIONS

Apple: "NR V2X Sidelink Physical Layer Procedures", 3GPP Draft, R1-1910964, 3GPP TSG RAN WG1 #98bis, NR V2X Sidelink Physical Layer Procedures, 3RD Generation Partnership Project (3GPP), Mobile Competence Centre, 650, Route Des Lucioles, F-06921 Sophia-Antipolis Cedex, France, vol. RAN WG1. no. Chongqing, China, Oct. 14, 2019-Oct. 20, 2019, Oct. 5, 2019 (Oct. 5, 2019), XP051808758, 7 Pages Retrieved from the Internet: URL:https://ftp.3gpp.org./tsg_ran/WG1_RL1/TSGR1_98b/Docs/R1-1910964.zip R1-1910964 NR V2X Sidelink Physical Layer Procedures. docx [retrieved on Oct. 5, 2019] Section 2.4.

(Continued)

*Primary Examiner* — Jackie Zuniga Abad
(74) *Attorney, Agent, or Firm* — Holland & Hart LLP

(57) ABSTRACT

Methods, systems, and devices for wireless communications are described. In some systems, two devices may communicate over a sidelink and support a mutually understood transport block (TB) size (TBS) determination procedure associated with a data channel including a control message. A first device may encode and transmit information on the data channel, including the control message and a data message. A second device may receive and decode the information on the data channel. The first device and the second device may determine a TBS for encoding and decoding the data channel, respectively, based on determining an estimated resource element (RE) overhead for the control message and determining an approximate TBS based on the estimated RE overhead.

22 Claims, 14 Drawing Sheets

(51) Int. Cl.
*H04W 72/53* (2023.01)
*H04W 92/18* (2009.01)

(56) References Cited

OTHER PUBLICATIONS

Intel Corporation: "Sidelink Physical Structure for NR V2X Communication", 3GPP Draft, R1-1912203, 3GPP TSG RAN WG1 Meeting #99, 3RD Generation Partnership Project (3GPP), Mobile Competence Centre, 650, Route Des Lucioles, F-06921 Sophia-Antipolis Cedex, France, vol. RAN WG1, no. Reno, Nevada, USA, Nov. 18, 2019-Nov. 22, 2019, Nov. 9, 2019 (Nov. 9, 2019), XP051823280, pp. 1-34, Retrieved from the Internet: URL:https://ftp.3gpp.org/tsg_ran/WG1_RL1/TSGR1_99/Docs/R1-1912203.zip R1-1912203 Intel- V2X_SL_L1_Struct.docx [retrieved on Nov. 9, 2019] Proposal 21, p. 18.
Intel Corporation: "Physical Structure for NR V2X", 3GPP Draft, 3GPP TSG RAN WG1 Meeting #98, R1-1908633 Intel—EV2X_SL_L1, 3RD Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051765241, pp. 1-24, Retrieved from the Internet: URL:http://www.3gpp.org/ftp/tsg_ran/WG1_RL1/TSGR1_98/Docs/R1-1908633.zip [retrieved on Aug. 17, 2019] Par.3, Section 3.5.
International Search Report and Written Opinion—PCT/US2021/014968—ISA/EPO—dated Apr. 20, 2021.

* cited by examiner

TRANSPORT BLOCK SIZE DETERMINATION FOR TWO STAGE CONTROL

CROSS REFERENCE

The present application for patent claims the benefit of U.S. Provisional Patent Application No. 62/975,914 by SARKIS et al., entitled "TRANSPORT BLOCK SIZE DETERMINATION FOR TWO STAGE CONTROL," filed Feb. 13, 2020, assigned to the assignee hereof, and expressly incorporated by reference herein.

FIELD OF TECHNOLOGY

The following relates generally to wireless communications, and including to transport block (TB) size (TBS) determination for two stage control.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A first device, such as a UE or a base station, may schedule communications with a second device by transmitting control information to the second device. In some cases, the first device may transmit the control information—or a portion of the control information—in a data channel and the control information may schedule a data message also transmitted in the data channel. Current techniques for decoding the control information and the data message in the data channel may be inefficient and, in some cases, may result in communication failures.

SUMMARY

The described techniques relate to improved methods, systems, devices, and apparatuses that support transport block (TB) size (TBS) determination for two stage control. Generally, the described techniques provide for accurate TBS determination of a TB associated with a data channel when a control message is present in the data channel (e.g., a physical sidelink shared channel (PSSCH)). For example, a first device may communicate with a second device and may transmit a control message to the second device in the data channel, where the control message provides information for decoding a data message also transmitted in the data channel. In some aspects, the control message and the data message may each occupy a number of resource elements (REs) of the data channel and the first device may encode the data channel (or one or both of the control message or the data message) based on the TBS associated with the data channel. In some cases, in order for the second device to successfully decode the data channel (or one or both of the control message or the data message), the second device may decode the data channel using the same coding rate that the first device used to encode the data channel. As such, some implementations of the present disclosure may enable a mutually understood or shared procedure between the first device and the second device to enable the first device and the second device to determine the same TBS to use for determining the coding rate that may be used for encoding or decoding the data channel.

In some implementations, the first device and the second device may determine a first RE overhead, which may be an approximation or estimation of the actual number of REs occupied by the control message in the data channel. The first device and the second device may determine a first TBS associated with the data channel based on determining the first RE overhead. The first TBS may likewise be an approximation or an estimation of the actual TBS associated with the data channel. The first TBS may be an intermediate TBS that the first device and the second device may use for actual TBS determinations or coding rate calculations. In some examples, the first device and the second device may commonly use the first RE overhead and the first TBS (e.g., the approximations) to encode or decode the channel. In such examples, the first device may encode the data channel (one or both of the control message or the data message) with a coding rate based on the first TBS. Likewise, the second device may decode the data channel (one or both of the control message or the data message) with a coding rate based on the first TBS.

Alternatively, in some other examples and based on similarly determining the first RE overhead and the first TBS, the first device and the second device may share a mutually understood intermediate TBS that both devices may use to determine an actual RE overhead and an actual TBS, which may result in the first device and the second device determining to use similar (or the same) coding rates for encoding and decoding, respectively. Accordingly, in some implementations, the first device and the second device may both use the intermediate TBS (e.g., a first TBS) to calculate an actual number of modulation symbols or REs occupied by the control message in the data channel. The first device and the second device may use the actual number of REs—or an indicated number of REs in the control message—to determine the actual TBS associated with the data channel. The first device may encode the data channel with a coding rate based on the actual TBS as determined from the intermediate TBS. Likewise, the second device may decode the data channel with a coding rate based on the actual TBS as similarly determined from the intermediate TBS.

DETAILED DESCRIPTION

Figure 1:
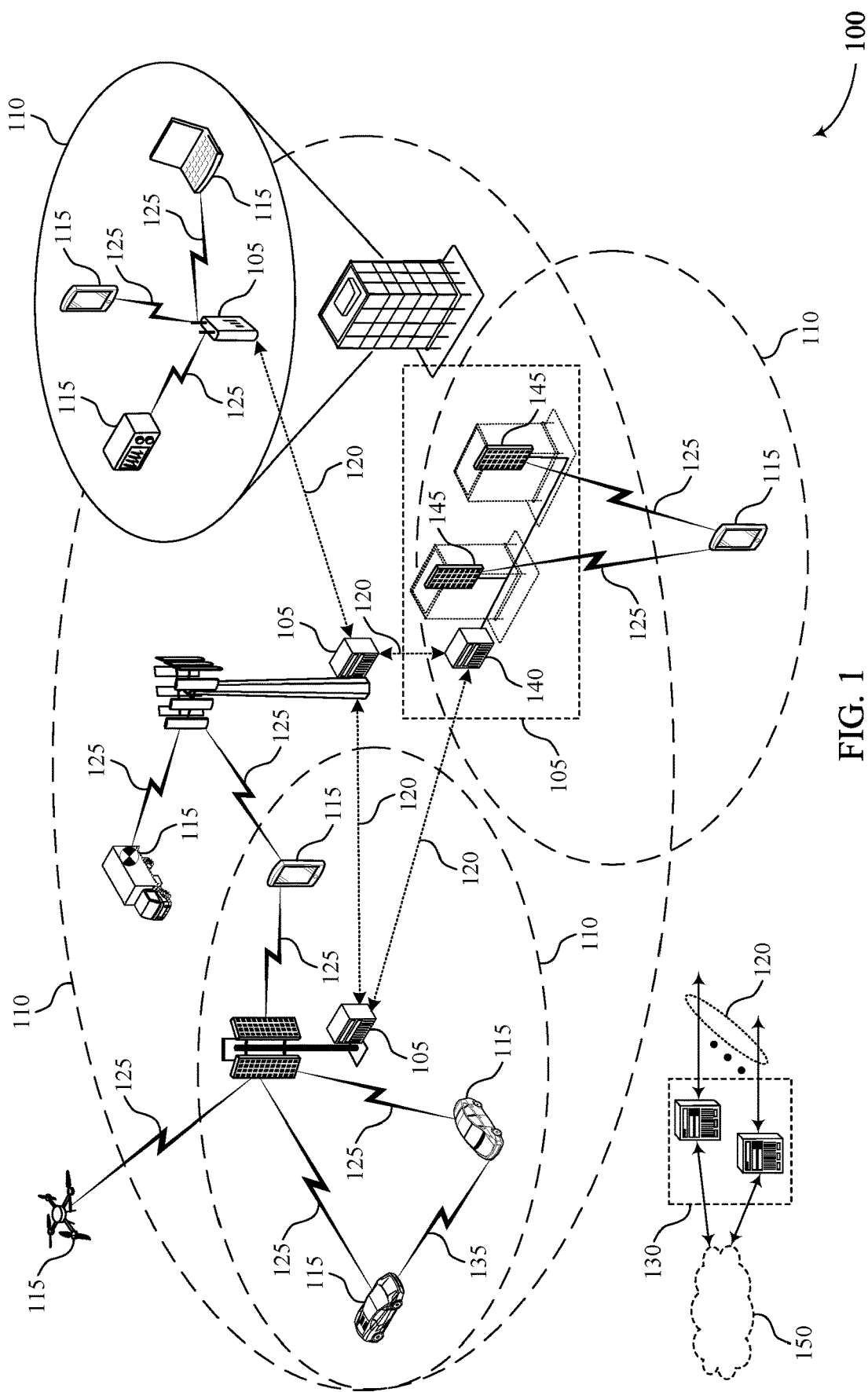
FIGS. 1 and 2 illustrate examples of wireless communications systems that support transport block (TB) size (TBS) determination for two stage control in accordance with aspects of the present disclosure.

As demand for communication resources increases due to an increasing number of wireless devices communicating over the available spectrum, techniques to efficiently and reliably increase throughput are desirable. In some cases, a first device may transmit a control message to a second device in a communication channel (e.g., a data channel), where the control message may indicate information for decoding a data message within the same communication channel. For example, the first device may implement a two stage control transmission, where a first portion of control information is transmitted in a control channel and a second portion of the control information is transmitted in a data channel. Such communication may be associated with reduced latency and greater throughput and may more efficiently use resources in the available spectrum. In some examples, the first device and the second device may be examples of user equipment (ULEs) communicating via a sidelink (e.g., the first device and the second device may be associated with a vehicle-to-everything (V2X) system or another system that supports sidelink communications). In such examples, the first device may transmit the control message and the data message to the second device in a data channel, such as a physical sidelink shared channel (PSSCH). If the control message is part of a two stage control transmission, the first device may transmit first stage sidelink control information (SCI1) in a physical sidelink control channel (PSCCH) and may transmit the control message—which may be an example of second stage sidelink control information (SCI2)—in the PSSCH.

In some cases, the control message may consume a relatively significant portion of the PSSCH (e.g., due to the payload size of the control message). As such, the resource element (RE) overhead associated with the control message in the data channel may not be ignored in transport block (TB) size (TBS) calculations without creating a significant mismatch between a coding rate used by the first device to encode the data channel and a coding rate used by the second device to decode the data channel. Such a mismatch may result in communication failures, as the second device may be unable to successfully decode the TBs in the data channel.

Various implementations of the present disclosure relate generally to efficient and consistent TBS and coding rate determination procedures across one or more wireless devices. In some specific implementations, the first device and the second device (e.g., UEs communicating over sidelink channels using two stage control procedures) may employ the same TBS determination procedure such that the first device and the second device both determine a same coding rate based on the same determined TBS. For example, the first device may determine an approximation of a number of REs associated with a control message (e.g., the SCI2 transmitted in the data channel), which may be referred to as an estimated RE overhead or a first RE overhead. The first device may use the estimated RE overhead to determine an approximation of a TBS, which may be referred to as a first TBS or an intermediate TBS. Similarly, the second device may determine the estimated RE overhead and determine the first TBS based on the estimated RE overhead. As such, the first device and the second device may determine the same first TBS, which the first device and the second device may use to determine a number of modulation symbols for the control message. The first device may encode the control message according to this number of modulation symbols and the second device may decode the control message according to this number of modulation symbols, supporting reliable transmission of the control message. In some examples, the first device and the second device may determine an actual TBS for the data channel based on the intermediate TBS (e.g., based on the number of modulation symbols or REs for the control message in the data channel). The first device and the second device may use the actual TBS to determine the same coding rate for encoding and decoding data in the data channel. Alternatively, in some other examples, the first device and the second device may use the approximated TBS to determine the same coding rate for encoding and decoding data (such as data messages) in the data channel.

In some cases, the first and second devices may determine the same estimated RE overhead for the control message (e.g., SCI2 in a PSSCH) based on the devices using a pre-configured value for the estimated RE overhead. In some other cases, the first device may indicate the estimated RE overhead in a control message transmitted in a control channel (e.g., SCI1 in a PSCCH). The estimated RE overhead may be defined per physical resource block (PRB) or per channel (e.g., per PSSCH). The devices may use the estimated RE overhead to determine the intermediate TBS and modulation symbols for the control message. Further, the devices may determine the number of REs available for a data transmission in the data channel based on the control message. For example, the devices may account for the RE overhead of the control message in the data channel by subtracting the actual number of REs for the control message (e.g., based on the determined number of modulation symbols), subtracting a number of REs signaled in the control message (e.g., and dynamically configured by the first device), or subtracting some combination thereof. The devices may determine the actual TBS for the data channel based on accounting for an RE overhead of the control message.

Particular aspects of the subject matter described herein may be implemented to realize one or more potential advantages. The described techniques may support more efficient and consistent TBS determination between two wireless devices communicating control information for a data channel over the data channel, which may result in a greater likelihood for successful decoding operations at a receiving device and, correspondingly, reduced latency for communications over the data channel (e.g., for sidelink communications over a PSSCH). This improved transmission reliability may result in fewer retransmission operations by the wireless devices, reducing the signaling overhead on the channel. Further, the two wireless devices may achieve power savings by reducing the number of sidelink retransmissions (e.g., of SCI2, sidelink data messages, or both). The wireless devices may also achieve a more robust communication link based on the consistent and common TBS determination, which may result in higher data rates, greater capacity for wireless communications, and improved spectral efficiency.

Aspects of the disclosure are initially described in the context of wireless communications systems. Additional aspects are described with reference to process flows. Aspects of the disclosure are further illustrated by and described with reference to apparatus diagrams, system diagrams, and additional flowcharts that relate to transport block size determination for two stage control.

FIG. 1 illustrates an example of a wireless communications system 100 that supports TBS determination for two stage control in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some implementations, a first device (e.g., a first UE 115) may communicate with a second device (e.g., a second UE 115) via a communication link (e.g., a D2D communication link 135, which may be referred to herein as a sidelink). In some examples, the first device may transmit a control message to the second device via the communication link in a communication channel, such as a data channel. For example, the first device and the second device may communicate over a D2D communication link 135 (e.g., a sidelink), and the first device may transmit the control message over a PSSCH. In some aspects, the first device may generate a control message that schedules—or otherwise indicates information for decoding-a data message for transmission in the same channel (e.g., in the same set of resources) in which the control message is transmitted. For example, the first device may transmit the control message in a data channel (e.g., the PSSCH) and the control message may include control information for receiving a data message that is also transmitted in the data channel. In some examples, the first device (e.g., the first UE 115) may determine an estimated (e.g., an approximate) RE overhead associated with the control message and may encode one or both of the control message or the data message based on a TBS determination procedure using the estimated RE overhead. In some cases, the estimated RE overhead may correspond to an estimated number of REs occupied by the control message in the data channel or a pre-configured approximation for the number of REs occupied by a control message in the data channel.

The second device (e.g., the second UE 115) may receive the encoded control message and may determine the estimated (e.g., the approximate) RE overhead. In some aspects, the second device may determine the same estimated RE overhead as the first device (e.g., based on signaling from the first device or a pre-configuration). The second device may decode one or both of the control message or the data message based on a TBS determination procedure using the estimated RE overhead. Further, in some examples and based on decoding the control message, the second device may determine an actual TBS and coding rate used by the first device for data messages on the data channel. As such, the first device and the second device may use a similar TBS determination procedure so that the first device and the second device both use similar (or the same) coding rates for encoding and decoding information in the data channel.

Figure 2:
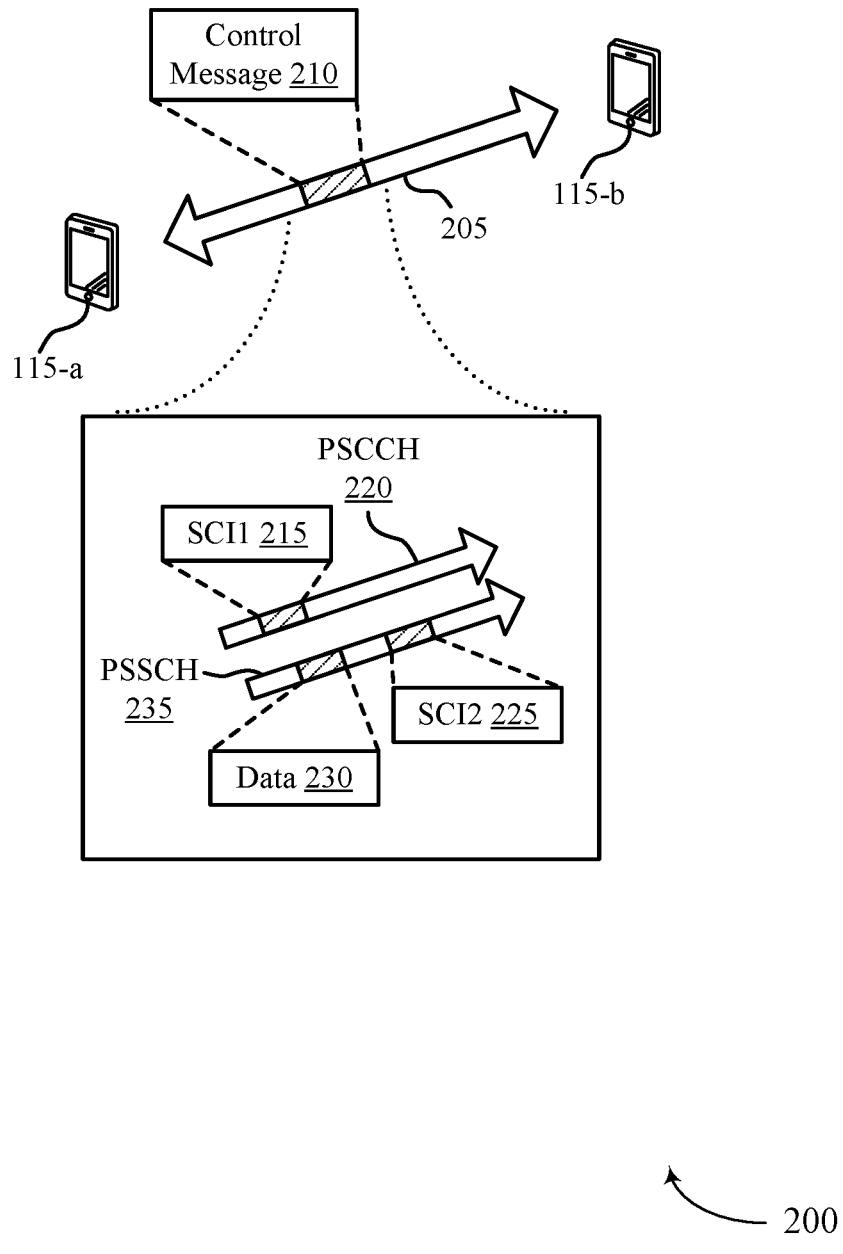

FIG. 2 illustrates an example of a wireless communications system 200 that supports TBS determination for two stage control in accordance with aspects of the present disclosure. In some examples, the wireless communications system 200 may implement aspects of the wireless communications system 100. In some cases, the wireless communications system 200 may include a UE 115-a and a UE 115-b, which may be examples of UEs 115 as described with reference to FIG. 1. However, the techniques described herein may be implemented by any wireless devices communicating, over a communication channel, control information for decoding the communication channel.

In some examples, the UE 115-a and the UE 115-b may both support sidelink communication capabilities and may communicate using a sidelink 205. In some cases, the sidelink 205 may be an example of a D2D link, a relay link, a private network link, an industrial IoT communication link, or any other similar communication link over which peer devices may communicate. In some examples, the wireless communications system 200 may be configured to support mutually understood procedures for TBS determination to increase the likelihood of successful communications within the wireless communications system 200.

In some cases, the UE 115-a may communicate with the UE 115-b over the sidelink 205. The UE 115-a may transmit a control message 210 to the UE 115-b to schedule a data message, such as data 230, over the sidelink 205. In some aspects, the UE 115-a and the UE 115-b (e.g., two wireless devices in an NR V2X communications system) may support a two stage control transmission and the control message 210 may be an example of a two stage control message. For example, the UE 115-a may separately transmit a first stage control message, such as SCI1 215, and a second stage control message, such as SCI2 225, to the UE 115-b. In some cases, the UE 115-a may transmit the SCI1 215 on a control channel, such as a PSCCH 220, and may transmit the SCI2 225 on a data channel, such as a PSSCH 235. In some aspects, the UE 115-a may transmit data 230 on the PSSCH 235 multiplexed with the SCI2 225 and, in some cases, the SCI2 225 may include control information associated with receiving or decoding the data 230.

Further, although described in the context of a two stage control transmission as a second stage control message, the SCI2 225 may be implemented in other types of control transmissions. For example, the SCI2 225 may correspond to any control message that is transmitted on the same channel as a data message for which the control message provides control information (e.g., indicating how to receive or decode the data message).

The SCI1 215 and SCI2 225 may each carry a portion of the control information for a PSSCH transmission. In some cases, the SCI1 215 may indicate a resource allocation (e.g., a resource allocation for the PSSCH 235), a format for the SCI2 225, a modulation and coding scheme (MCS) associated with the PSSCH 235, or some combination of these or other control information fields. The UE 115-a may transmit the SCI2 225 in the PSSCH 235 according to the SCI1 215. In some cases, the SCI2 225 may be multiplexed with the data 230 in the PSSCH 235. The SCI2 225 may include a redundancy version (RV) for the data 230, an identifier field (e.g., a process identifier field associated with a HARQ process for the data 230), or some combination of these or other control information fields.

In some aspects, the SCI2 225 may be associated with a relatively large payload of information bits (e.g., above some payload threshold for the PSSCH 235). For example, the SCI2 225 may carry a payload of greater than 70 bits. In some cases, the UE 115-a may modulate the SCI2 225 based on a modulation order, where the modulation order refers to or otherwise involves quadrature phase shift keying (QPSK). Based on the relatively large payload of information bits and the QPSK modulation order for the SCI2 225, the SCI2 225 may occupy a significant portion of the PSSCH 235 (e.g., greater than a threshold proportion of the REs for the PSSCH 235). For example, when implementing QPSK and a coding rate of 1/4, the SCI2 225 may be associated with approximately 300 modulation symbols corresponding to an RE overhead of approximately 300 REs in the PSSCH 235. Such an RE overhead may be non-trivial when performing TBS calculations for the PSSCH 235.

In some cases, the UE 115-a may encode the SCI2 225 and the data 230 in the PSSCH 235 (e.g., may encode the PSSCH 235) based on a coding rate and may transmit the encoded SCI2 225 and the encoded data 230 on the PSSCH 235 to the UE 115-b. Additionally, in some cases, the UE 115-a may transmit an indication of a coding rate to the UE 115-b. In some examples, the UE 115-a may transmit the indication of the coding rate to the UE 115-b in an MCS field in the SCI1 215.

The UE 115-b may receive the encoded SCI2 225 and the encoded data 230 on the PSSCH 235 and may attempt to decode the encoded SCI2 225 and the encoded data 230. In some examples, the UE 115-b may determine a coding rate based on the TBS associated with a number of available REs of the PSSCH 235, the MCS indicated in the SCI1 215, or a combination thereof. In some cases, the SCI2 225 may occupy a portion of the PSSCH 235 (e.g., a number of REs of the PSSCH 235) below a threshold portion and the UE 115-a may use a coding rate that is sufficiently similar to the coding rate indicated to the UE 115-b in the MCS. Accordingly, the UE 115-b may successfully decode the encoded SCI2 225 and the encoded data 230 (e.g., may successfully decode the encoded PSSCH 235).

In some other cases, however, the SCI2 225 may occupy a portion of the PSSCH 235 above the threshold portion, such that the number of REs occupied by the SCI2 225 has a non-trivial effect on the TBS calculation. This may sufficiently change the TBS of the PSSCH 235 such that the UE 115-a uses a coding rate that is sufficiently different from (e.g., higher than) the coding rate indicated to the UE 115-b in the MCS. For example, the determined coding rate based on TBS and the coding rate indicated by the MCS may diverge by greater than a threshold amount. In such cases, the UE 115-b may be unable to successfully decode the encoded SCI2 225 and the encoded data 230.

For example, the UE 115-a may encode the data 230 using a TBS without consideration or without knowledge of the number of REs occupied by the SCI2 225. As such, when the portion of the PSSCH 235 occupied by the SCI2 225 becomes sufficiently large, the SCI2 225 may sufficiently influence the TBS associated with the PSSCH 235 such that the UE 115-b may determine to use a different coding rate than the coding rate with which the UE 115-a encoded the data 230.

In order to maintain similarity between the coding rate that a UE 115 (either or both of the UE 115-a or the UE 115-b) determines based on the TBS (e.g., an actual coding rate) and the coding rate indicated in the MCS, the UE 115 may exclude the number of REs occupied by the SCI2 225 when determining the TBS. For example, the UE 115 may attempt to determine the number of REs occupied by the SCI2 225 and subtract that number from the total TBS. The number of REs (or the number of modulation symbols, which may indicate the number of REs) occupied by the SCI2 225 may be defined by Equation 1 below.

$$Q'_{SCI2} = \min\left\{\left\lceil\frac{(O_{SCI2} + L_{SCI2}) \cdot \beta_{offset}^{SCI2} \cdot \sum_{l=0}^{N_{symbol}^{PSSCH}-1} M_{sc}^{SCI2}(l)}{\sum_{r=0}^{C_{SL-SCH}-1} K_r}\right\rceil, \left\lceil\alpha \sum_{l=0}^{N_{symbol}^{PSSCH}-1} M_{SC}^{SCI2}(l)\right\rceil\right\} + \gamma \quad (1)$$

$Q'_{SCI2}$ may be the number of modulation symbols occupied by the SCI2 225 (e.g., where the number of modulation symbols may be equivalent to the number of REs occupied by the SCI2 225), $O_{SCI2}$ is the number of the SCI format 0-2 (e.g., SCI2) bits, and $L_{SCI2}$ is the number of CRC bits for SCI2 (e.g., may be any number of bits). In some cases, $\beta_{offset}^{SCI2}$ may be a value indicated in a corresponding SCI format 0-1 (e.g., SCI1) message, and $M_{sc}^{SCI2}(l)$ may be the number of REs that are used for transmission of the SCI2 in OFDM symbol l, for l=0, 1, 2, . . . , $N_{symbol}^{PSSCH}-1$, in the data channel transmission (e.g., in the transmission of the SCI2 225 on the PSSCH 235). $N_{symbol}^{PSSCH}$ may be the number of allocated symbols for the PSSCH 235. In some cases, $N_{symbol}^{PSSCH}$ may exclude one or more automatic gain control (AGC) symbols, for example, as defined by a specification. In some cases, α may be a value configured by a higher layer parameter, such as SL-scaling. In some cases, $K_r$ may be the r-th code block size for a PSSCH transmission. In some cases, $$\sum_{r=0}^{C_{SL-SCH}-1} K_r$$

may be similar or equal to the TBS. For example, if there is one code block or if the TB is partitioned into multiple code blocks, then $$\sum_{r=0}^{C_{SL-SCH}-1} K_r$$

may be equal to or slightly larger than the TBS. In some cases, the UE 115 may use more shortening bits if there is one code block, which may result in a relatively larger difference between $$\sum_{r=0}^{C_{SL-SCH}-1} K_r$$

and the TBS.

In some examples, the number of REs that are occupied by the SCI2 225 (e.g., corresponding to the modulation symbols for the SCI2 225) may depend on the TBS. For example, $K_r$ may be dependent on the TBS. As such, the UE 115 may attempt to determine the TBS in order to calculate the number of REs occupied by the SCI2 225. To calculate the TBS for the PSSCH 235, the UE 115 may calculate a number of available REs per PRB based on Equation 2 below.

$$N'_{RE} = N_{SC}^{RB} \cdot N_{symbol}^{sh} - N_{DMRS}^{PRB} - N_{oh}^{PRB} \quad (2)$$

$N'_{RE}$ may be the number of available REs per PRB, $N_{SC}^{RB}$ may be a number of symbols in an RB (e.g., 12 symbols), $N_{symbol}^{sh}$ may be a number of allocated symbols for the PSSCH 235, $N_{DMRS}^{PRB}$ may be a number of REs for scheduled demodulation reference signals (DMRSs) per PRB in the channel (e.g., an overhead associated with DMRS), and $N_{oh}^{PRB}$ may be a configured overhead (e.g., may be semi-statically configurable to 0, 6, 12, or 18).

The UE 115 may use the calculated number of available REs per PRB to determine the number of available REs for the transmission of the SCI2 225 and the data 230 on the PSSCH 235 (e.g., the number of available REs per channel), which the UE 115 may use to determine the TBS. In some cases, the number of available REs per channel may be determined per slot or per TTI. For example, the UE 115 may calculate the number of available REs for the PSSCH 235 based on Equation 3 below.

$$N_{RE} = \min(n, N'_{RE}) \cdot n_{PRB} \quad (3)$$

In some cases, $N_{RE}$ may be the number of available REs in the PSSCH 235, n may be a constant (e.g., 144 or 156) corresponding to an upper limit or maximum number of available REs per TTI for a PRB, and $n_{PRB}$ may be the total number of allocated PRBs for the UE 115 (e.g., the resource allocation). In some examples, the UE 115 may use the number of available REs in the PSSCH 235 to determine the TBS. However, as shown in Equation 2 and Equation 3, such calculations for the TBS do not account for the overhead of the SCI2 225, potentially resulting in the misaligned coding rates as described herein. Further, the UE 115 may be unable to simply add the overhead of the SCI2 225 into the above Equations, as this overhead is the variable that the UE 115 was initially trying to solve for using the TBS. Thus, a circular dependency condition arises and the UE 115 may be unable to determine the number of REs occupied by the SCI2 225. For instance, the overhead of the SCI2 225 may be calculated based on the TBS, the TBS may be calculated based on the number of available REs in the PSSCH 235 (e.g., the number of REs that may include the data 230), and the number of available REs in the PSSCH 235 may be calculated based on the overhead of the SCI2 225. As such, the receiving UE 115-b may be unable to determine what portion or how many REs of the PSSCH 235 to use to determine the TBS associated with a similar (or identical) coding rate to the coding rate used by the transmitting UE 115-a.

In some implementations of the present disclosure, the UE 115-a and the UE 115-b may be configured with one or more mutually understood rules that may enable the UE 115-a and the UE 115-b to exclude the number of REs occupied by the SCI2 225 from the available REs in the PSSCH 235 when performing the TBS determination procedure. In some examples, the UE 115-a and the UE 115-b may determine a TBS excluding the number of REs occupied by the SCI2 225 based on a shared approximation (e.g., an estimation or an assumption) of the overhead of the SCI2 225.

In some examples, the UE 115-a and the UE 115-b may use the same RE overhead approximation to determine an approximate TBS (e.g., an intermediate TBS) that the UE 115-a and the UE 115-b may use to determine an actual or exact overhead of the SCI2 225. The UE 115-a and the UE 115-b may use the actual or exact overhead of the SCI2 225 to determine the actual TBS (e.g., by excluding the number of REs occupied by the SCI2 225 from the available REs for the PSSCH 235 in the TBS calculation). Accordingly, the UE 115-a and the UE 115-b may determine a same actual TBS for the PSSCH 235 and, correspondingly, may use similar or identical coding rates, which may increase the likelihood of successful decoding at the UE 115-b and may result in more reliable wireless communications. In some other examples, the UE 115-a and the UE 115-b may use the approximate TBS to determine similar or identical coding rates for one or both of the SCI2 225 or the data 230. Additional details of the mutually understood rules are described with reference to FIG. 3.

Figure 3:
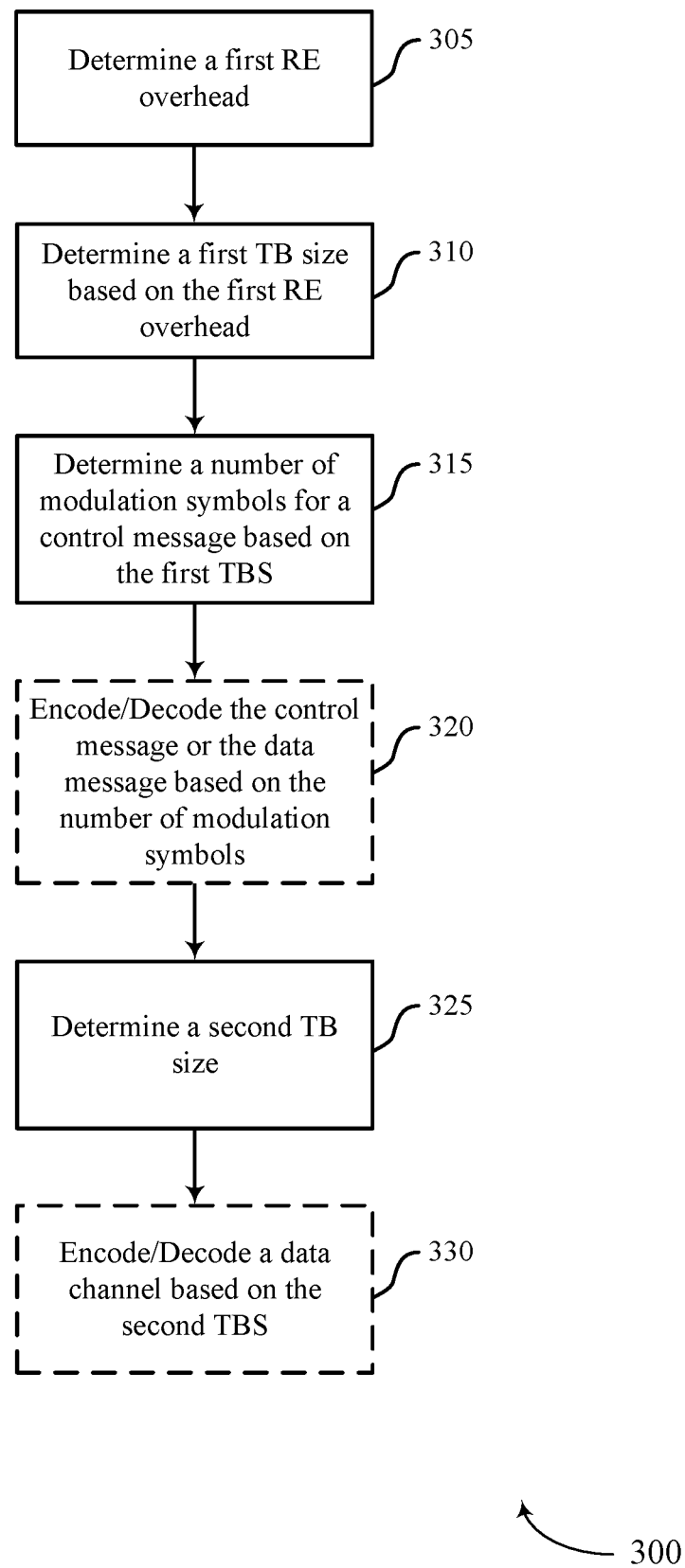
FIGS. 3 and 4 illustrate examples of process flows that support TBS determination for two stage control in accordance with aspects of the present disclosure.

FIG. 3 illustrates an example of a process flow 300 that supports TBS determination for two stage control in accordance with aspects of the present disclosure. In some examples, the process flow 300 may implement or be implemented to realize aspects of the wireless communications systems 100 or the wireless communications system 200. The process flow 300 may include a number of operations performed by a device, such as a UE 115 as described with reference to FIGS. 1 and 2, in accordance with the techniques described herein. In some examples, the operations illustrated in the process flow 300 may be performed by hardware (e.g., including circuitry, processing blocks, logic components, and other components), code (e.g., software or firmware) executed by a processor, or any combination thereof.

In some examples, a device may monitor a data channel to receive a control message (e.g., a second stage control message, such as an SCI2 225 as described with reference to FIG. 2) and a data message (such as data 230 as described with reference to FIG. 2). The device may implement the process flow 300 to accurately and consistently determine a coding rate associated with the data channel based on a TBS associated with the REs available for data transmission on the data channel (e.g., excluding the REs occupied by the control message). In some examples, the device may implement the process flow 300 to break a circular dependency condition, such as the circular dependency condition described with reference to FIG. 2.

At 305, the device may determine a first RE overhead. In some examples, the first RE overhead may be an approximation or an estimation of a number of REs that the control message may occupy in the data channel. In some implementations, the estimated RE overhead is determined for the purpose of determining a first TBS (e.g., an intermediate TBS or a hypothetical TBS).

In some examples, the estimated RE overhead may be a predetermined value (e.g., a specified value pre-configured at both a transmitting device and a receiving device). For example, the device may store a predetermined value and may use the stored predetermined value as the estimated RE overhead. In some cases, the estimated RE overhead may be calculated based on one or more pre-configured values. For example, one or more of the variables in Equation 1 (e.g., $\alpha$, $\beta_{offset}^{SCI2}$, etc.) may be pre-configured and the device may use Equation 1 or the pre-configured values to determine the estimated RE overhead.

Additionally or alternatively, in some specific examples, the $$\sum_{r=0}^{C_{SL\_SCH}-1} K_r$$

denominator term in Equation 1 (e.g., the term calculated based on the TBS, which may be unknown) may be expressed as an approximate or estimated ratio with one or more other terms in Equation 1 (e.g., one or more variables in the numerator). For example, the device may determine to use a ratio to approximately express the $$\sum_{r=0}^{C_{SL\_SCH}-1} K_r$$

term and one or more other terms based on a known target MCS (e.g., a known target MCS of the data channel, which may be indicated in the first stage control message). As such, the device may break the circular dependency condition and may solve Equation 1 (e.g., solve an approximation of Equation 1) for an approximate or an estimated number of REs occupied by the control message (e.g., the second stage control message).

In some other examples, a parameter may explicitly indicate the estimated RE overhead. For instance, the device may identify an RRC parameter that indicates the first RE overhead (e.g., an RRC parameter may indicate the first RE overhead is 10 REs). Additionally or alternatively, the estimated RE overhead may be signaled in the first stage control message (e.g., SCI1). In some examples, the device may receive the first stage control message in a control channel and may identify a field that indicates the value (e.g., the number of REs) that the device may use for the estimated RE overhead. In some other examples, the device may receive the first stage control message and may identify an index included in the first stage control information that corresponds to an estimated RE overhead for the device to use. For instance, the device may store a number of predetermined or pre-configured estimated RE overhead values (e.g., in a lookup table in memory) and the first stage control message may indicate, via an index or one or more bits, which estimated RE overhead value the device may use. In some cases, the devices may store a pre-configured estimated RE overhead value, and the transmitting device may indicate an estimated RE overhead (e.g., in SCI1) to override the pre-configured value.

In some examples, the device may use a value for the estimated RE overhead that may be unrelated to the second stage control message. For example, the device may use a number that may be inclusive of multiple different RE overheads associated with the data channel. For instance, the device may identify a first RE overhead associated with the term $-(N_{DMRS}^{PRB}+N_{oh}^{PRB})$ in Equation 2 that may be inclusive of overhead associated to DMRS and semi-statically indicated overhead. In such examples, the first RE overhead may be predetermined (e.g., defined in a specification), pre-configured, or indicated to the device in the first stage control message or in other signaling (e.g., RRC signaling).

At 310, the device may determine a TBS (e.g., a first TBS or an intermediate TBS) based on the estimated RE overhead. In some examples, the first TBS may be an approximation or an estimation of the actual TBS associated with the data channel. In some aspects, the first TBS may be an intermediate TBS that is similarly determined by the device and any other devices in communication with the device using the data channel. As such, the first TBS may be a consistent value from which subsequent TBS and coding rate calculations may be based for the device and the any other devices. As such, communicating devices may calculate similar coding rates.

The device may determine the first TBS based on whether the estimated RE overhead is determined per PRB or per PSSCH (e.g., per channel). If the estimated RE overhead is defined per PRB, the estimated RE overhead may be included in Equation 2. For example, the first TBS may be calculated based on Equation 4 when the estimated RE overhead is determined per PRB.

$$N'_{RE}=N_{SC}^{RB} \cdot N_{symbol}^{sh}-N_{DMRS}^{PRB}-N_{oh,1}^{PRB}$$

$$N_{RE}=\min(n,N'_{RE}) \cdot n_{PRB} \quad (4)$$

In some cases, $N_{oh,1}^{PRB}$ may be the estimated RE overhead per PRB. In some examples, in addition or alternative to the examples of how the estimated RE overhead may be determined at 305, $N_{oh,1}^{PRB}$ may be signaled in the first stage control message or the second stage control message. In some specific examples, the first stage control message or the second stage control message may signal that $N_{oh,1}^{PRB}$ is one of a set of configurable values (e.g., 0, 6, 12, or 18). In such examples, $N_{oh,1}^{PRB}$ may be dynamically selected by a transmitting device and signaled to a receiving device. In some examples, $N_{oh,1}^{PRB}$ may be a separate field in addition to (e.g., separate from) $N_{oh,1}^{PRB}$. For example, the first TBS may be determined based on Equation 5 in the case that $N_{oh,1}^{PRB}$ is a separate value in addition to $N_{oh}^{PRB}$.

$$N'_{RE}=N_{SC}^{RB} \cdot N_{symbol}^{sh}-N_{DMRS}^{PRB}-N_{oh}^{PRB}-N_{oh,1}^{PRB}$$

$$N_{RE}=\min(n,N'_{RE}) \cdot n_{PRB} \quad (5)$$

In Equation 5, $N_{oh,1}^{PRB}$ may be semi-statically configured, while $N_{oh,1}^{PRB}$ may be dynamically determined (e.g., based on SCI1) or pre-configured.

If the estimated RE overhead is defined per PSSCH, the estimated RE overhead may be included in (e.g., appended to) Equation 3. For example, the first TBS may be calculated based on Equation 6 when the estimated RE overhead is determined per PSSCH. In some cases, $N_{RE,oh}$ may be the estimated RE overhead per PSSCH.

$$N'_{RE}=N_{SC}^{RB} \cdot N_{symbol}^{sh}-N_{DMRS}^{PRB}$$

$$N_{RE}=\min(n,N'_{RE}) \cdot n_{PRB}-N_{RE,oh} \quad (6)$$

At 315, the device may determine a number of modulation symbols for the control message (e.g., the actual number of modulation symbols for SCI2) based on the first TBS (e.g., an intermediate TBS for a hypothetical PSSCH transmission). In some aspects, the control message may be a rank-1 transmission and, accordingly, the number of modulation symbols of the control message may be equivalent to the number of REs used to transmit the control message. In some additional aspects, the data channel may be two layers and the modulation symbols of the control message may be repeated in both layers.

In some implementations, the device may use the first TBS to determine the number of bits in each code block, which may be associated with a value for the $$\sum_{r=0}^{C_{SL-SCH}-1} K_r$$

term in Equation 1. For example, $$\sum_{r=0}^{C_{SL-SCH}-1} K_r$$

may be calculated based on the first TBS (e.g., the intermediate TBS) and, accordingly, the $$\sum_{r=0}^{C_{SL-SCH}-1} K_r$$

may be different than the actual TBS. In some specific examples, $$\sum_{r=0}^{C_{SL-SCH}-1} K_r$$

may be the intermediate TBS. For example, $K_r$, in the context of TBS and coding rate determination procedures in sidelink communications, may correspond to an $r^{th}$ code block size for a hypothetical sidelink shared channel transmission of the intermediate TBS. In some implementations, the device may determine the number of modulation symbols for the control message using Equation 1 and the $$\sum_{r=0}^{C_{SL-SCH}-1} K_r$$

value associated with the intermediate TBS (e.g., as opposed to using an actual TBS for the data channel in Equation 1).

At 320, the device may encode or decode one or both of the control message or the data message based on the determined number of modulation symbols for the control message. In examples in which the device is a transmitting device and transmits the control message on the data channel, the device may encode one or both of the control message or the data message based on the determined number of modulation symbols for the control message. Alternatively, in examples in which the device is a receiving device and receives the control message from another device on the data channel, the device may decode one or both of the control message or the data message based on the determined number of modulation symbols for the control message.

At 325, the device may determine a second TBS. In some examples, the second TBS may be the actual TBS for the data channel (e.g., the PSSCH) and may be the same or different from the first TBS (e.g., the intermediate TBS). The second TBS determination procedure may be more accurate than the first TBS determination procedure for the data channel based on the device (e.g., a device transmitting or receiving on the data channel) having more accurate information about the available resources for the PSSCH transmission (e.g., especially regarding the RE overhead of the control message on the PSSCH) than when determining the first TBS. For example, the device may determine the exact RE overhead of the control message (e.g., SCI2) on the data channel (e.g., PSSCH).

The device may determine the second TBS based on subtracting the determined number of REs for the control message from the number of REs used for TBS calculations (e.g., the number of available REs). In some examples, the determined number of REs may correspond to the number of modulation symbols calculated for the control message at 315. In such examples, the device may subtract the calculated number of REs (e.g., the actual number of REs for the control message, as opposed to the estimated number of REs for the control message) from the number of available REs.

Additionally or alternatively, a number of REs associated with the control message may be signaled in the control message. For example, the control message may include a field or a value that indicates a number of REs to subtract from the number of available REs for the second TBS calculation. The transmitting device may dynamically select this indicated number of REs (e.g., based on the actual number of REs for the control message, a retransmission procedure for the control message, the data, or both, or some combination thereof). In some implementations, the control message may indicate whether physical sidelink feedback channel (PSFCH) symbols may be excluded (e.g., subtracted) from the number of available REs. Additionally or alternatively, the control message may indicate whether channel state information (CSI) reference signal (CSI-RS) overhead may be excluded from the number of available REs. In such examples, the device may subtract the indicated number (or numbers) of REs from the number of available REs and may use the updated number of available REs (e.g., after the REs are subtracted) to determine the actual TBS for the data channel.

In some examples, the device may both calculate the number of REs for the control message and receive one or more indications in the control message indicating one or more numbers of REs to exclude from the number of available REs. In such examples, the device may exclude the sum of the calculated actual number of REs for the control message and the one or more numbers of REs indicated by the control message. In some implementations, the control message may indicate the one or more numbers of REs for exclusion from the number of available REs to refine or adjust the number of REs calculated by the device for the control message.

In some aspects, the control message may indicate a relatively small number of REs to be excluded from the number of available REs based on the device additionally excluding the actual number of REs calculated for the control message. As such, the control message may use a fewer number of bits than if the device relied entirely on one or more indications in the control message. Further, the number of REs indicated for exclusion from the number of available REs by the control message may be defined per PRB and, as such, may be associated with a multiplication operation, similar to the one described in Equation 3: $N_{RE} = \min(n, N'_{RE}) \cdot n_{PRB}$. The multiplication operation may increase the influence of each of the number of bits carried by the control message. As such, the control message may carry a small number of bits (e.g., indicate a small number of REs), but the multiplication operation may translate the small number into a larger number (e.g., $n_{PRB}$ times larger).

At 330, the device may encode or decode the data channel (including one or both of the control message or the data message) based on the second TBS. For example, in the case where the device is a transmitting device, the device may encode the data channel (e.g., a PSSCH data transmission on the PSSCH) based on the second TBS. In the case where the device is a receiving device, the device may decode the data channel based on the second TBS. In some examples, the device may determine a coding rate based on the determined second TBS, which may include the number of REs of the data channel excluding a number of REs associated with overhead (e.g., the control message). In some implementations, this may enable the device to determine a coding rate that is similar to—or the same as—a coding rate used by the transmitting device in the encoding process for the data channel. As such, the receiving device may have a higher likelihood of successfully decoding the data channel compared to a different device that may determine a coding rate based on a TBS calculation in which the number of available REs does not account for the control message overhead (or inaccurately accounts for the control message overhead). As such, the device may decode the data channel based on the second TBS according to a mutually understood rule between the receiving device and the transmitting device.

Figure 4:
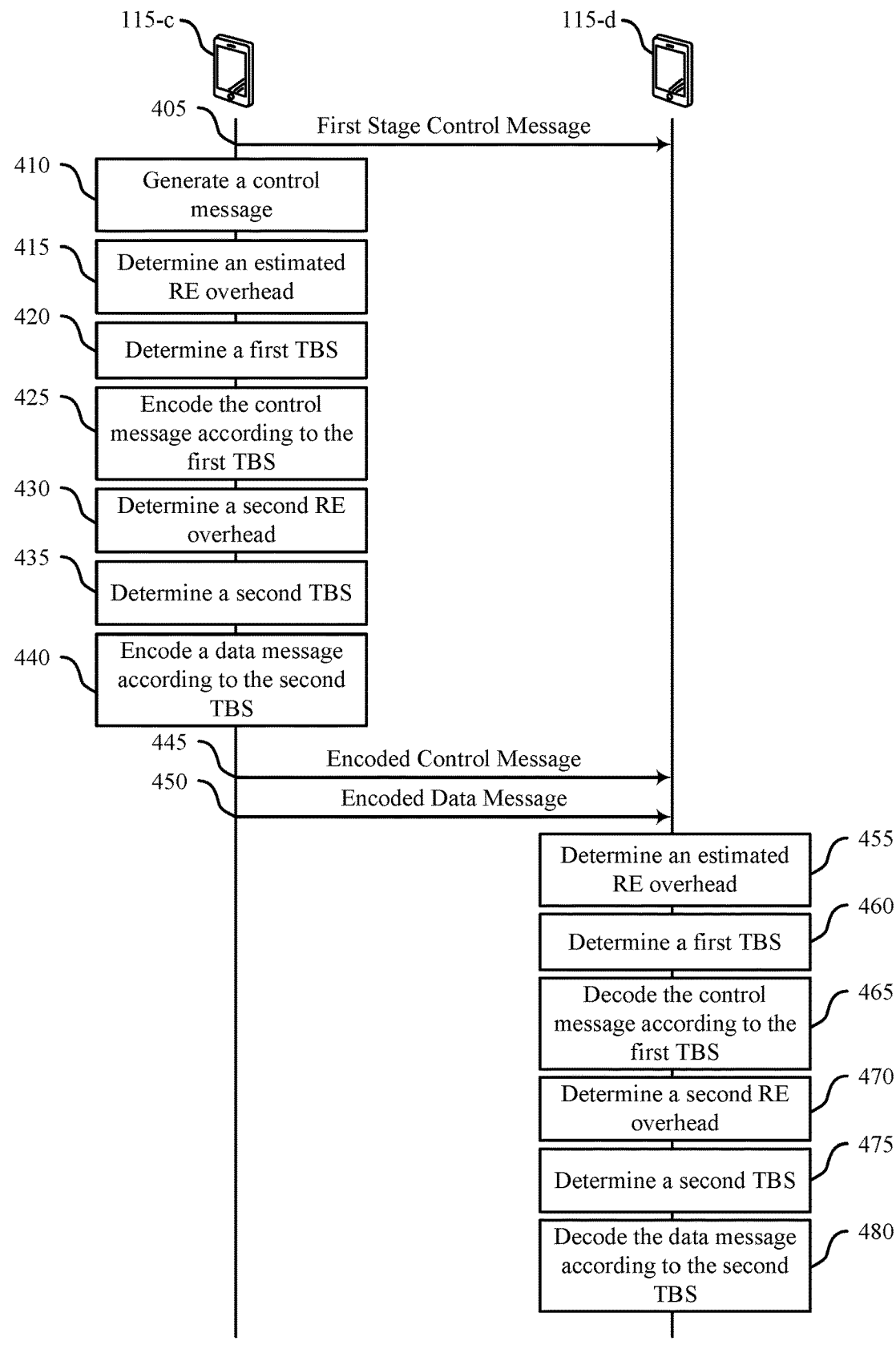

FIG. 4 illustrates an example of a process flow 400 that supports TBS determination for two stage control in accordance with aspects of the present disclosure. In some examples, the process flow 400 may implement or be implemented to realize aspects of the wireless communications systems 100 or the wireless communications system 200. In the following description of the process flow 400, the communications between a UE 115-c and a UE 115-d may be transmitted in a different order than the order shown, or the operations performed by the UE 115-c and the UE 115-d may be performed in different orders or at different times. Specific operations may also be left out of the process flow 400, or other operations may be added to the process flow 400. In some examples, the UE 115-c and the UE 115-d may support a mutually understood rule that may enable the UE 115-c and the UE 115-d to independently determine a similar (or the same) coding rate for encoding or decoding a data channel (including one or both of a control message or a data message) in accordance with the techniques described herein.

At 405, the UE 115-c may transmit a first stage control message (e.g., an SCI1) to the UE 115-d. In some examples, the first stage control information may include one or more of a second stage control information format, a resource allocation (e.g., for a scheduled data channel), or an MCS, among other control information fields. In some cases, the UE 115-c may transmit the first stage control message on a sidelink control channel, such as a PSCCH.

At 410, the UE 115-c may generate a control message. As described herein, the control message may be an example of the second stage control message (e.g., an SCI2).

At 415, the UE 115-c may determine an estimated RE overhead. In some examples, the UE 115-c may determine the estimated RE overhead for the purpose of determining an intermediate TBS associated with the scheduled data channel, as described in more detail with reference to FIG. 3.

This estimated RE overhead may be associated with the control message generated at 410. For example, the estimated RE overhead may approximately account for an RE overhead of the control message. In some cases, the first stage control message transmitted at 405 may include an indication of the estimated RE overhead.

At 420, the UE 115-c may determine a TBS. In some examples, the TBS may be an intermediate TBS (e.g., a first TBS) and the UE 115-c may use the TBS to determine an actual RE overhead and an actual TBS, as described in more detail with reference to FIG. 3.

At 425, the UE 115-c may encode a control message (e.g., the second stage control message) according to the TBS. In some examples, the UE 115-c may encode the control message based on a number of modulation symbols for the control message, where the number of modulation symbols may be determined based on the TBS. Additionally or alternatively, the UE 115-c may encode a data message according to the TBS or the estimated RE overhead associated with the control message generated at 410.

At 430, the UE 115-c may determine a second RE overhead. In some examples, the second RE overhead may be the actual RE overhead for the control message, a value indicated in the control message, or a combination thereof, as described in more detail with reference to FIG. 3.

At 435, the UE 115-c may determine a second TBS. In some examples, the second TBS may be the actual TBS and may include the number of REs of the data channel excluding a number of REs associated with overhead of the data channel (e.g., the second RE overhead), as described in more detail with reference to FIG. 3.

At 440, the UE 115-c may encode a data message according to the second TBS. In some examples, the UE 115-c may encode the data message according to the second TBS based on a mutually understood rule between the UE 115-c and the UE 115-d, as described in more detail with reference to FIG. 3. In some aspects, the UE 115-c may encode the data message according to the second TBS in examples in which the UE 115-c refrains from encoding the data message according to the first TBS (or the estimated RE overhead) at 425.

At 445, the UE 115-c may transmit the encoded control message and, at 450, the UE 115-c may transmit the encoded data message. In some examples, the UE 115-c may transmit the encoded control message and the encoded data message in the same data channel (e.g., a sidelink shared channel). In some cases, the encoded control message may be rate-matched around the encoded data message.

At 455, the UE 115-d may determine an estimated RE overhead. In some aspects, the UE 115-d may determine the same estimated RE overhead as the UE 115-c based on a pre-configured value for the estimated RE overhead or based on receiving an indication of the estimated RE overhead in the first stage control message at 405. In some examples, the UE 115-d may determine the estimated RE overhead for the purpose of determining an intermediate TBS associated with the data channel, as described in more detail with reference to FIG. 3.

At 460, the UE 115-d may determine a TBS. In some aspects, the UE 115-d may determine a similar or identical TBS as the UE 115-c. In some examples, the TBS may be an intermediate TBS (e.g., a first TBS) and the UE 115-d may use the TBS to determine an actual RE overhead and an actual TBS, as described in more detail with reference to FIG. 3.

At 465, the UE 115-d may decode the control message (e.g., the second stage control message) according to the TBS. Additionally, in some examples, the UE 115-d may decode the control message based on a number of modulation symbols calculated for the control message, as described in more detail with reference to FIG. 3. Additionally or alternatively, the UE 115-d may decode the encoded data message based on the TBS or the estimated RE overhead associated with the control message.

At 470, the UE 115-d may determine a second RE overhead. In some aspects, the UE 115-d may determine a similar or identical second RE overhead as the UE 115-c. In some examples, the second RE overhead may be the actual RE overhead for the control message, a value indicated by the control message, or a combination thereof, as described in more detail with reference to FIG. 3.

At 475, the UE 115-d may determine a second TBS. In some aspects, the UE 115-d may determine a similar or identical second TBS as the UE 115-c. In some examples, the second TBS may be the actual TBS for the data channel and may include the number of REs of the data channel excluding a number of REs associated with overhead of the data channel (e.g., including the second RE overhead), as described in more detail with reference to FIG. 3.

At 480, the UE 115-d may decode the data message according to the second TBS. In some examples, the UE 115-d may decode the data message according to the second TBS based on a mutually understood rule between the UE 115-c and the UE 115-d, as described in more detail with reference to FIG. 3. In some aspects, the UE 115-d may decode the data message according to the second TBS in examples in which the UE 115-d refrains from decoding the data message according to the first TBS (or the estimated RE overhead) at 465.

Figure 5:
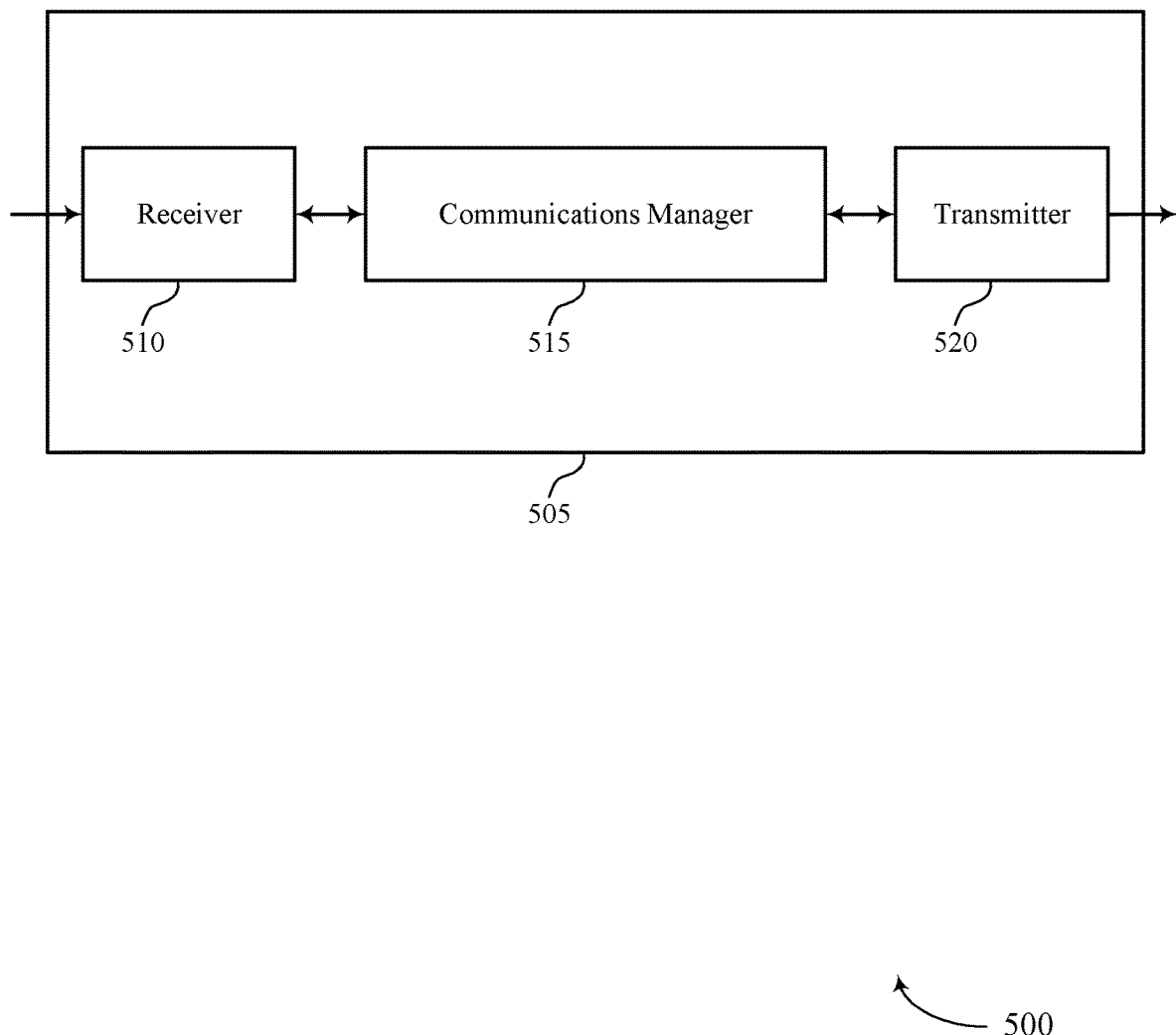
FIGS. 5 and 6 illustrate block diagrams of devices that support TBS determination for two stage control in accordance with aspects of the present disclosure.

FIG. 5 shows a block diagram 500 of a device 505 that supports TBS determination for two stage control in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to TBS determination for two stage control, etc.). Information may be passed on to other components of the device 505. The receiver 510 may be an example of aspects of the transceiver 820 described with reference to FIG. 8. The receiver 510 may utilize a single antenna or a set of antennas.

In some implementations, the communications manager 515 may generate a control message, determine an estimated RE overhead associated with the control message, encode the control message according to a TBS that is based on the estimated RE overhead, and transmit the encoded control message. Additionally or alternatively, the communications manager 515 may receive an encoded control message, determine an estimated RE overhead associated with the encoded control message, and decode the encoded control message according to a TBS that is based on the estimated RE overhead. The communications manager 515 may be an example of aspects of the communications manager 810 described herein.

In some other implementations, the communications manager 515 may encode a data message according to a TBS that is based on an estimated RE overhead associated with a control message, where the estimated RE overhead is different from an actual RE overhead for the control message, and transmit, to a second UE, the encoded data message. Additionally or alternatively, the communications manager 515 may receive, from a first UE, an encoded data message, and decode the encoded data message according to a TBS that is based on an estimated RE overhead associated with a control message, where the estimated RE overhead is different from an actual RE overhead for the control message.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The communications manager 515 as described herein may be implemented to realize one or more potential advantages. One implementation may allow the device 505, communicating control information in a same data channel as data decodable based on the control information, to consistently and accurately determine a coding rate that matches a coding rate used by another device based on using a common TBS determination procedure for the data channel. In some examples, the common TBS determination procedure may enable two communicating devices to have a greater likelihood for successful communications, reducing the number of retransmissions on the data channel. Reducing the number of retransmissions may reduce the signaling overhead and communication latency on the data channel (e.g., a PSSCH).

Further, by implementing the common TBS determination procedure, the device 505 may reduce a number of processing operations associated with encoding and transmitting a data message or receiving and decoding the data message. For example, if the device 505 is a transmitting device (e.g., the device 505 transmits the data message), the device 505 may reduce a number of retransmissions of the data message because the device 505 may use a similar (or the same) coding rate for encoding the data message as a receiving device uses for decoding the data message, increasing the likelihood of successful reception. Reducing the number of data message retransmissions may reduce a number of times the processor ramps up processing power and turns on processing units to perform the retransmissions. Likewise, if the device 505 is a receiving device (e.g., the device 505 receives the data message), the device 505 may be more likely to successfully receive the data message and may avoid performing a number of processing operations associated with monitoring for and attempting to decode a number of retransmissions of the data channel.

Based on techniques for more efficient and consistent TBS and coding rate determination, the device 505 may experience improved power savings and increased battery life. For example, based on reducing the number of processing operations, the device 505 may power down or turn off a number of processing units associated with encoding and transmitting or receiving and decoding messages.

Figure 6:
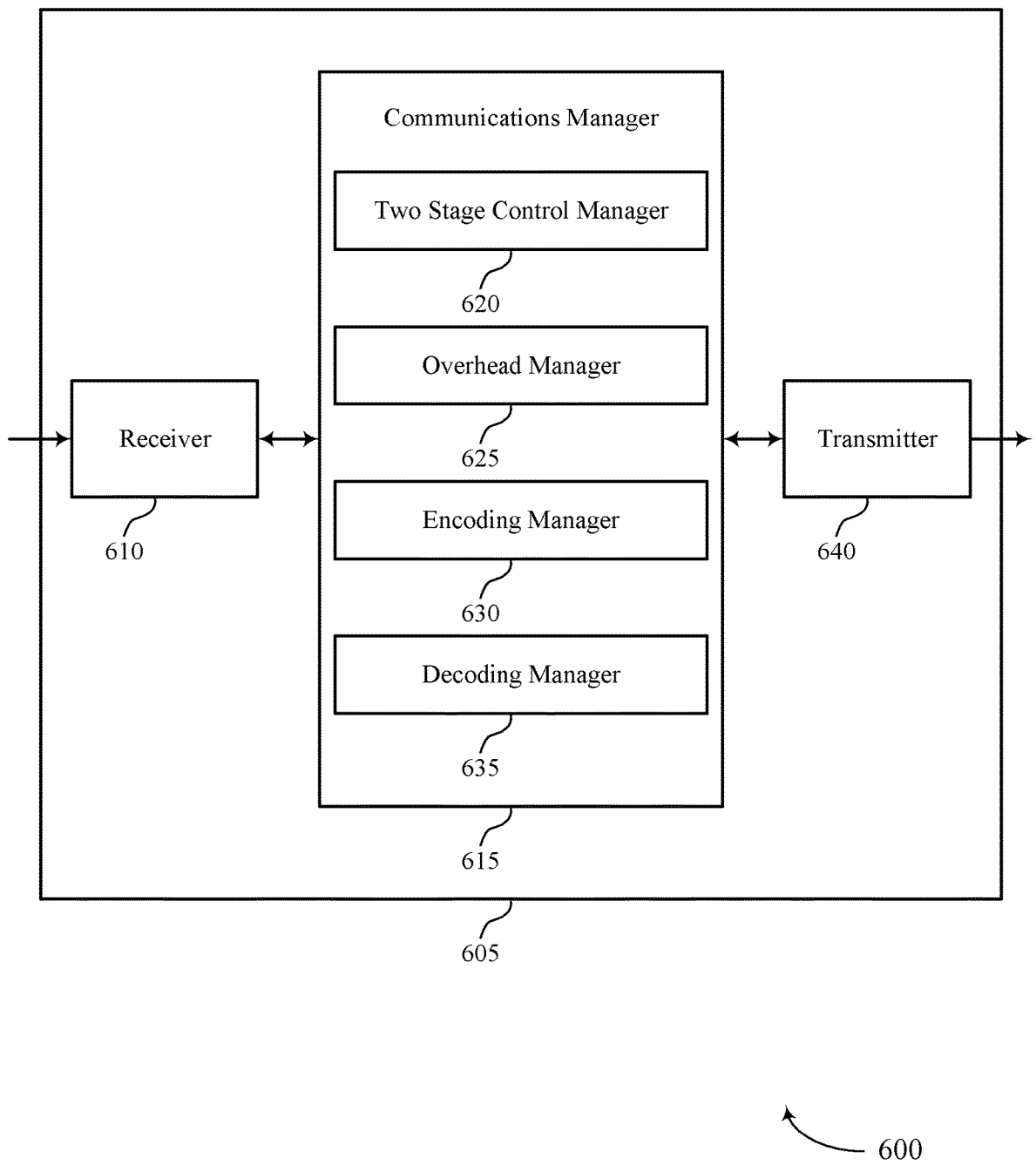

FIG. 6 shows a block diagram 600 of a device 605 that supports TBS determination for two stage control in accordance with aspects of the present disclosure. The device 605 may be an example of aspects of a device 505 or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to TBS determination for two stage control, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a two stage control manager 620, an overhead manager 625, an encoding manager 630, and a decoding manager 635. The communications manager 615 may be an example of aspects of the communications manager 810 described herein.

In some implementations, the two stage control manager 620 may generate a control message. The overhead manager 625 may determine an estimated RE overhead associated with the control message (e.g., where the estimated RE overhead may be different from an actual RE overhead for the control message). The encoding manager 630 may encode the control message according to a TBS that is based on the estimated RE overhead. The two stage control manager 620 may transmit the encoded control message. Additionally or alternatively, the two stage control manager 620 may receive an encoded control message. The overhead manager 625 may determine an estimated RE overhead associated with the encoded control message (e.g., where the estimated RE overhead may be different from an actual RE overhead for the encoded control message). The decoding manager 635 may decode the encoded control message according to a TBS that is based on the estimated RE overhead.

In some other implementations, the encoding manager 630 may encode a data message according to a TBS that is based on an estimated RE overhead associated with a control message, where the estimated RE overhead is different from an actual RE overhead for the control message. The two stage control manager 620 may transmit, to a second UE, the encoded data message. Additionally or alternatively, the two stage control manager 620 may receive, from a first UE, an encoded data message. The decoding manager 635 may decode the encoded data message according to a TBS that is based on an estimated RE overhead associated with a control message, where the estimated RE overhead is different from an actual RE overhead for the control message.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
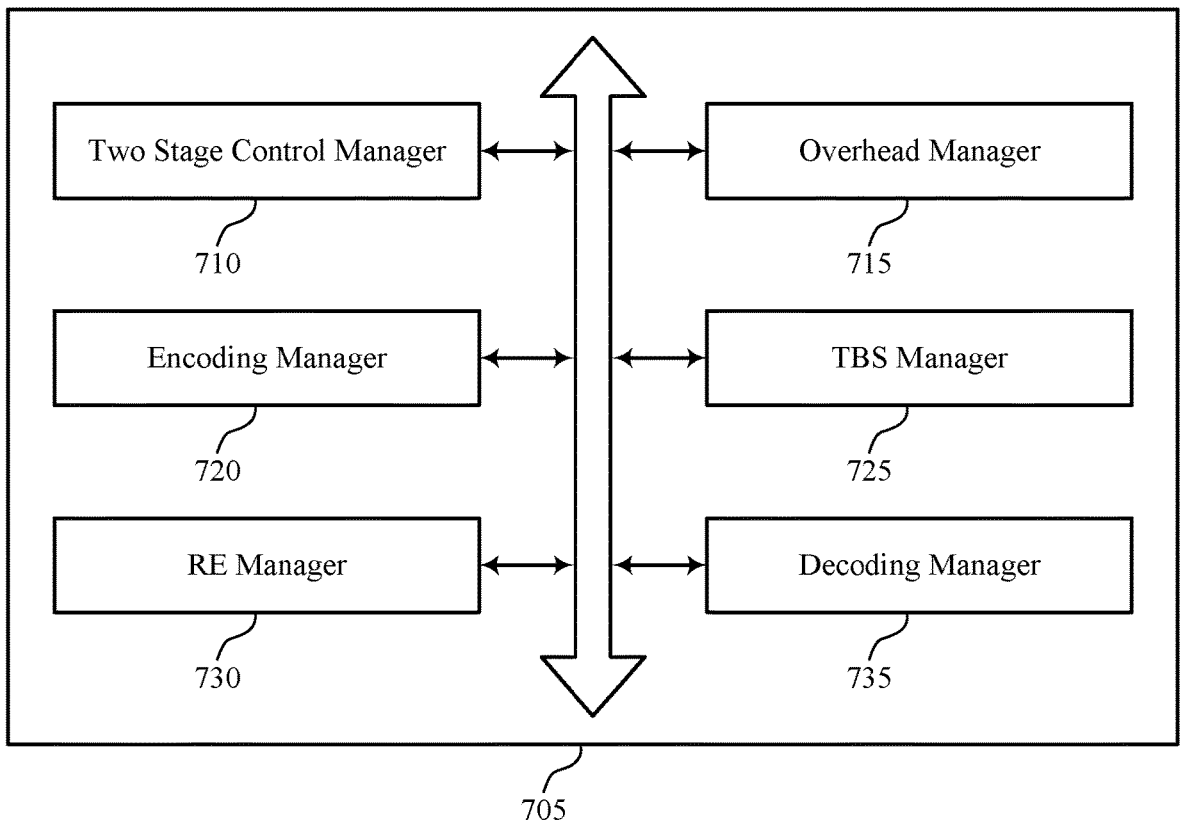
FIG. 7 illustrates a block diagram of a communications manager that supports TBS determination for two stage control in accordance with aspects of the present disclosure.

FIG. 7 shows a block diagram 700 of a communications manager 705 that supports TBS determination for two stage control in accordance with aspects of the present disclosure. The communications manager 705 may be an example of aspects of a communications manager 515, a communications manager 615, or a communications manager 810 described herein. The communications manager 705 may include a two stage control manager 710, an overhead manager 715, an encoding manager 720, a TBS manager 725, an RE manager 730, and a decoding manager 735. Each of these modules may communicate, directly or indirectly, with one another (e.g., via one or more buses). The communications manager 705 may perform a method for wireless communications as described herein, where the method for wireless communications may be implemented by a UE 115.

In some implementations, the two stage control manager 710 may generate a control message. The overhead manager 715 may determine an estimated RE overhead associated with the control message. In some examples, the estimated RE overhead associated with the control message is different from an actual RE overhead for the control message. The encoding manager 720 may encode a data message or the control message according to a TBS that is based on the estimated RE overhead. In some examples, the encoding manager 720 may determine a number of modulation symbols for the control message based on the TBS, where the data message or the control message is encoded according to the number of modulation symbols. The two stage control manager 710 may transmit the encoded data message or the encoded control message.

In some examples, the TBS is an example of a first TBS (e.g., an intermediate TBS), and the overhead manager 715 may determine a second RE overhead based on one or both of an actual RE overhead for the control message or an overhead value indicated in the control message. The TBS manager 725 may determine a second TBS based on the second RE overhead. In some examples, the encoding manager 720 may encode a data message according to the second TBS and the two stage control manager 710 may transmit the encoded data message. In some cases, the encoded control message and the encoded data message are transmitted in a sidelink shared channel. In some cases, the encoded control message schedules transmission of the encoded data message.

In some examples, the RE manager 730 may determine a number of available REs for a sidelink shared channel and the TBS manager 725 may subtract the second RE overhead from the number of available REs to obtain an updated number of available REs for the sidelink shared channel, where the second TBS is determined based on the updated number of available REs.

In some cases, the estimated RE overhead is an example of a pre-configured value. In some other cases, the control message may be an example of a second stage control message, and the two stage control manager 710 may transmit, to the second UE, a first stage control message in a sidelink control channel, where the first stage control message indicates the estimated RE overhead, and may transmit, to the second UE, the second stage control message in a sidelink shared channel. In some examples, the estimated RE overhead is defined per PRB or per channel.

In some additional or alternative implementations, the two stage control manager 710 may receive, from a first UE, an encoded data message or an encoded control message. The overhead manager 715 may determine an estimated RE overhead associated with the encoded control message. In some examples, the estimated RE overhead associated with the encoded control message is different from an actual RE overhead for the encoded control message. The decoding manager 735 may decode the encoded data message or the encoded control message according to a TBS that is based on the estimated RE overhead. In some examples, the decoding manager 735 may determine a number of modulation symbols for the encoded control message based on the TBS, where the encoded data message or the encoded control message is decoded according to the number of modulation symbols.

In some examples, the TBS is an example of a first TBS (e.g., an intermediate TBS), and the overhead manager 715 may determine a second RE overhead based on one or both of an actual RE overhead for the encoded control message or an overhead value indicated in the encoded control message. The TBS manager 725 may determine a second TBS based on the second RE overhead. In some examples, the two stage control manager 710 may receive an encoded data message and the decoding manager 735 may decode the encoded data message according to the second TBS. In some cases, the encoded control message and the encoded data message are received in a sidelink shared channel. In some cases, the encoded data message is decoded based on information decoded from the encoded control message.

In some examples, the RE manager 730 may determine a number of available REs for a sidelink shared channel and the TBS manager 725 may subtract the second RE overhead from the number of available REs to obtain an updated number of available REs for the sidelink shared channel, where the second TBS is determined based on the updated number of available REs.

In some cases, the estimated RE overhead is an example of a pre-configured value. In some other cases, the encoded control message may be an example of a second stage control message, and the two stage control manager 710 may receive, from the first UE, a first stage control message in a control channel, where the first stage control message indicates the estimated RE overhead, and may receive, from the first UE, the second stage control message in a sidelink shared channel. In some examples, the estimated RE overhead is defined per PRB or per channel.

Figure 8:
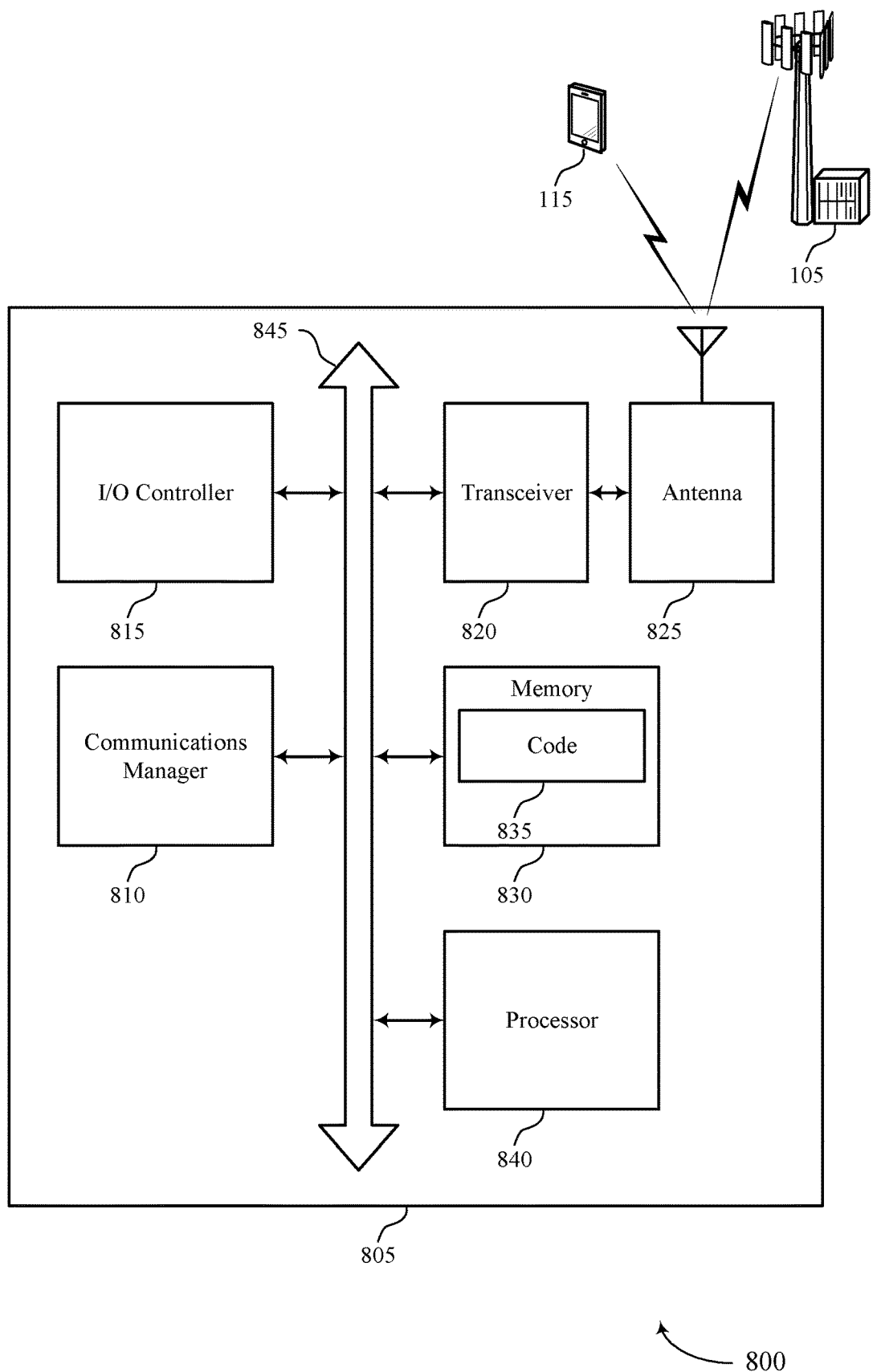
FIG. 8 illustrates a diagram of a system including a device that supports TBS determination for two stage control in accordance with aspects of the present disclosure.

FIG. 8 shows a diagram of a system 800 including a device 805 that supports TBS determination for two stage control in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

In some implementations, the communications manager 810 may generate a control message, determine an estimated RE overhead associated with the control message, encode the control message according to a TBS that is based on the estimated RE overhead, and transmit the encoded control message. Additionally or alternatively, the communications manager 810 may receive an encoded control message, determine an estimated RE overhead associated with the encoded control message, and decode the encoded control message according to a TBS that is based on the estimated RE overhead.

In some other implementations, the communications manager 810 may encode a data message according to a TBS that is based on an estimated RE overhead associated with a control message, where the estimated RE overhead is different from an actual RE overhead for the control message, and transmit, to a second UE, the encoded data message. Additionally or alternatively, the communications manager 810 may receive, from a first UE, an encoded data message, and decode the encoded data message according to a TBS that is based on an estimated RE overhead associated with a control message, where the estimated RE overhead is different from an actual RE overhead for the control message.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting TBS determination for two stage control).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
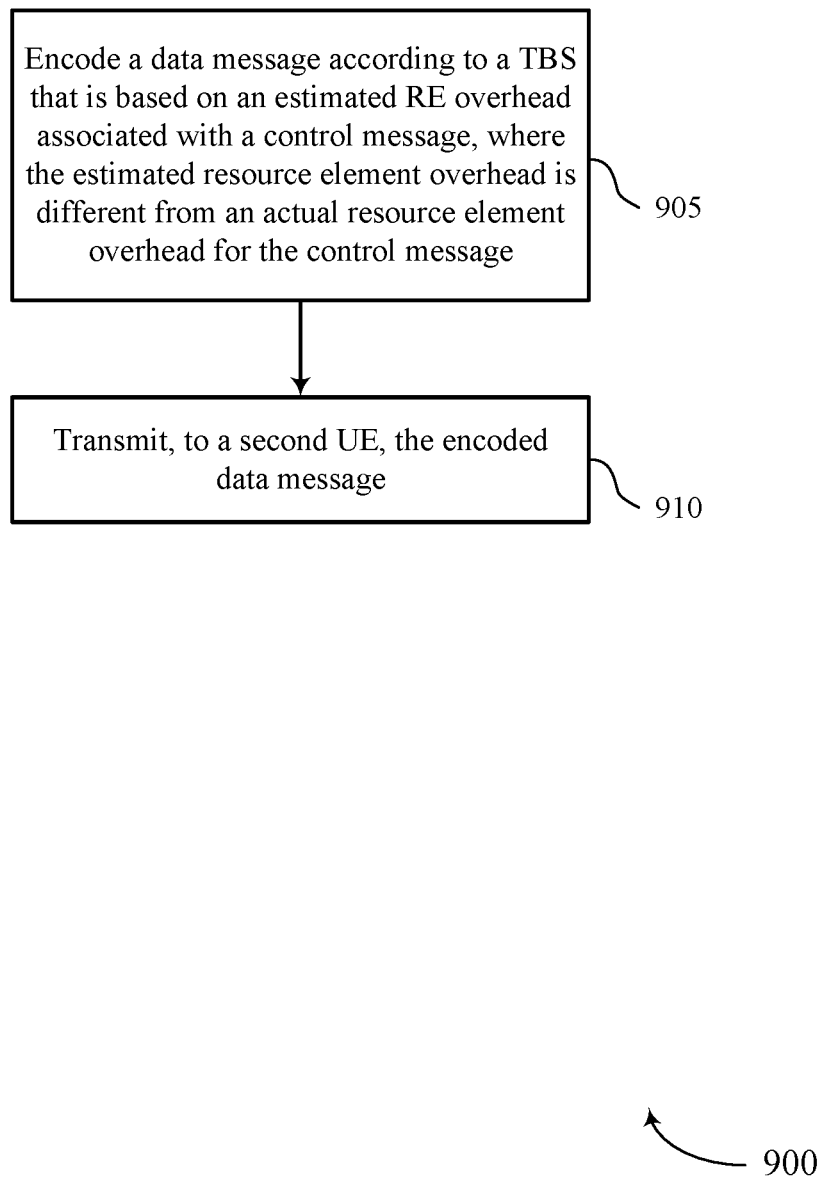
FIGS. 9 through 14 show flowcharts illustrating methods that support TBS determination for two stage control in accordance with aspects of the present disclosure.

FIG. 9 shows a flowchart illustrating a method 900 that supports TBS determination for two stage control in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 905, the UE may encode a data message according to a TBS that is based on an estimated RE overhead associated with a control message, where the estimated resource element overhead is different from an actual resource element overhead for the control message. The operations of 905 may be performed according to the methods described herein. In some examples, aspects of the operations of 905 may be performed by an encoding manager as described with reference to FIGS. 5 through 8.

At 910, the UE may transmit, to a second UE, the encoded data message. The operations of 910 may be performed according to the methods described herein. In some examples, aspects of the operations of 910 may be performed by a two stage control manager as described with reference to FIGS. 5 through 8.

Figure 10:
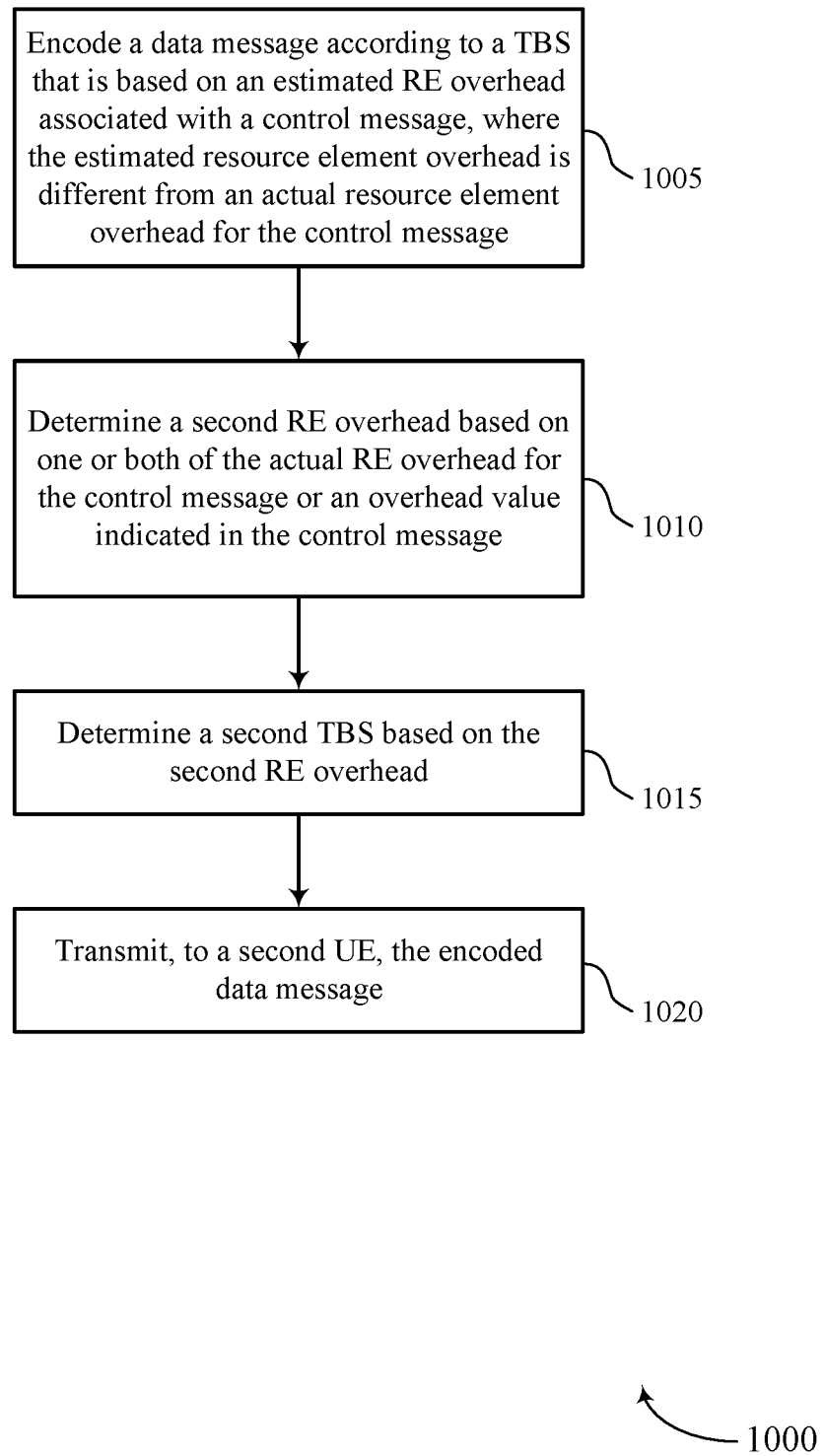

FIG. 10 shows a flowchart illustrating a method 1000 that supports TBS determination for two stage control in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1005, the UE may encode a data message according to a TBS that is based on an estimated RE overhead associated with a control message, where the estimated resource element overhead is different from an actual resource element overhead for the control message. The operations of 1005 may be performed according to the methods described herein. In some examples, aspects of the operations of 1005 may be performed by an encoding manager as described with reference to FIGS. 5 through 8.

At 1010, the UE may determine a second RE overhead based on one or both of the actual RE overhead for the control message or an overhead value indicated in the control message. The operations of 1010 may be performed according to the methods described herein. In some examples, aspects of the operations of 1010 may be performed by an overhead manager as described with reference to FIGS. 5 through 8.

At 1015, the UE may determine a second TBS based on the second RE overhead. The operations of 1015 may be performed according to the methods described herein. In some examples, aspects of the operations of 1015 may be performed by a TBS manager as described with reference to FIGS. 5 through 8.

At 1020, the UE may transmit, to a second UE, the encoded data message. The operations of 1020 may be performed according to the methods described herein. In some examples, aspects of the operations of 1020 may be performed by a two stage control manager as described with reference to FIGS. 5 through 8.

Figure 11:
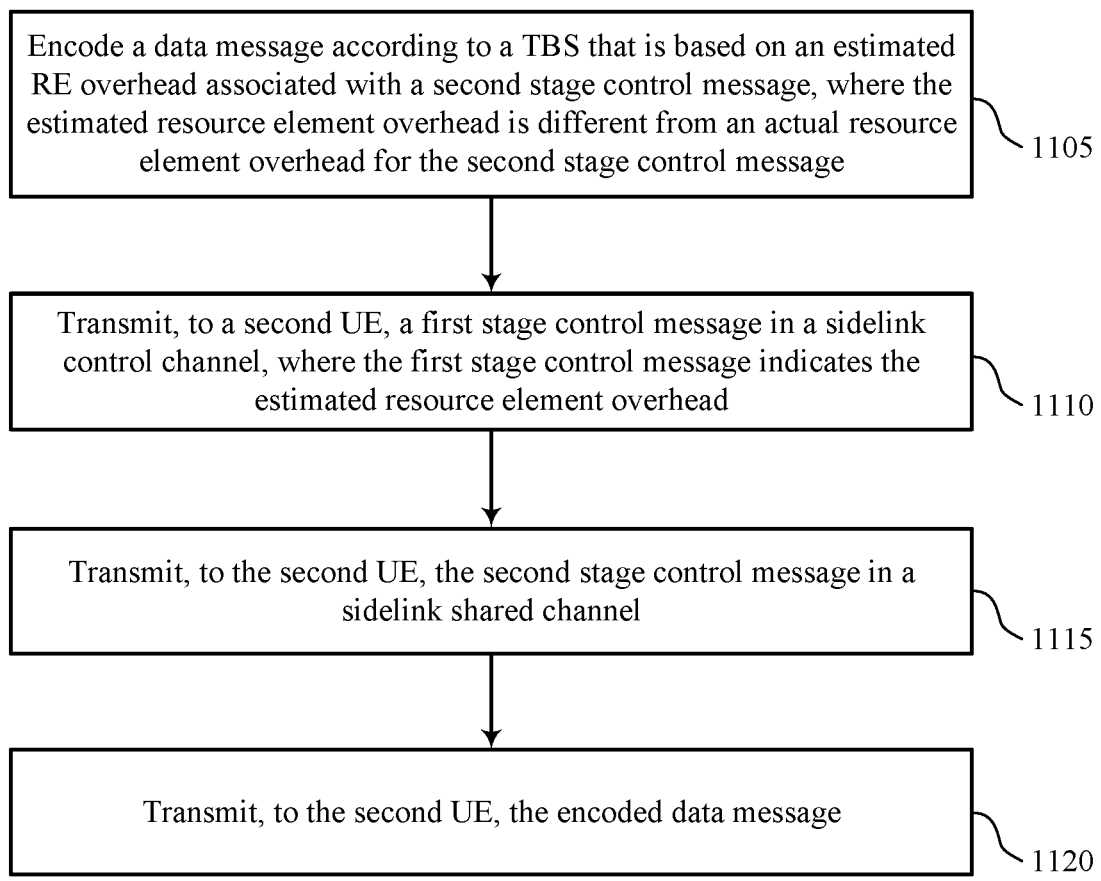

FIG. 11 shows a flowchart illustrating a method 1100 that supports TBS determination for two stage control in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1105, the UE may encode a data message according to a TBS that is based on an estimated RE overhead associated with a second stage control message, where the estimated resource element overhead is different from an actual resource element overhead for the second stage control message. The operations of 1105 may be performed according to the methods described herein. In some examples, aspects of the operations of 1105 may be performed by an encoding manager as described with reference to FIGS. 5 through 8.

At 1110, the UE may transmit, to a second UE, a first stage control message in a sidelink control channel, where the first stage control message indicates the estimated resource element overhead. The operations of 1110 may be performed according to the methods described herein. In some examples, aspects of the operations of 1110 may be performed by a two stage control manager as described with reference to FIGS. 5 through 8 (e.g., using a transmitter or transceiver).

At 1115, the UE may transmit, to the second UE, the second stage control message in a sidelink shared channel. The operations of 1115 may be performed according to the methods described herein. In some examples, aspects of the operations of 1115 may be performed by a two stage control manager as described with reference to FIGS. 5 through 8 (e.g., using a transmitter or transceiver).

At 1120, the UE may transmit, to the second UE, the encoded data message. The operations of 1120 may be performed according to the methods described herein. In some examples, aspects of the operations of 1120 may be performed by a two stage control manager as described with reference to FIGS. 5 through 8 (e.g., using the transmitter or transceiver).

Figure 12:
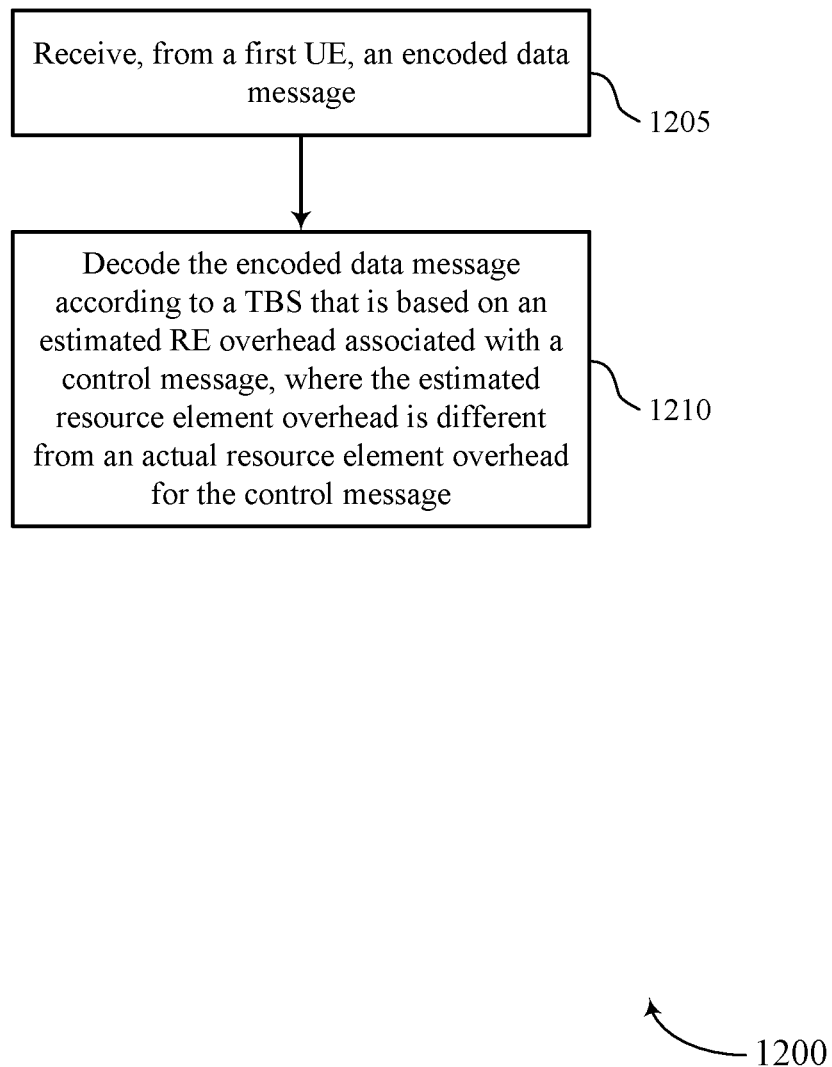

FIG. 12 shows a flowchart illustrating a method 1200 that supports TBS determination for two stage control in accordance with aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1205, the UE may receive, from a first UE, an encoded data message. The operations of 1205 may be performed according to the methods described herein. In some examples, aspects of the operations of 1205 may be performed by a two stage control manager as described with reference to FIGS. 5 through 8.

At 1210, the UE may decode the encoded data message according to a TBS that is based on an estimated RE overhead, where the estimated resource element overhead is different from an actual resource element overhead for the control message. The operations of 1210 may be performed according to the methods described herein. In some examples, aspects of the operations of 1210 may be performed by a decoding manager as described with reference to FIGS. 5 through 8.

Figure 13:
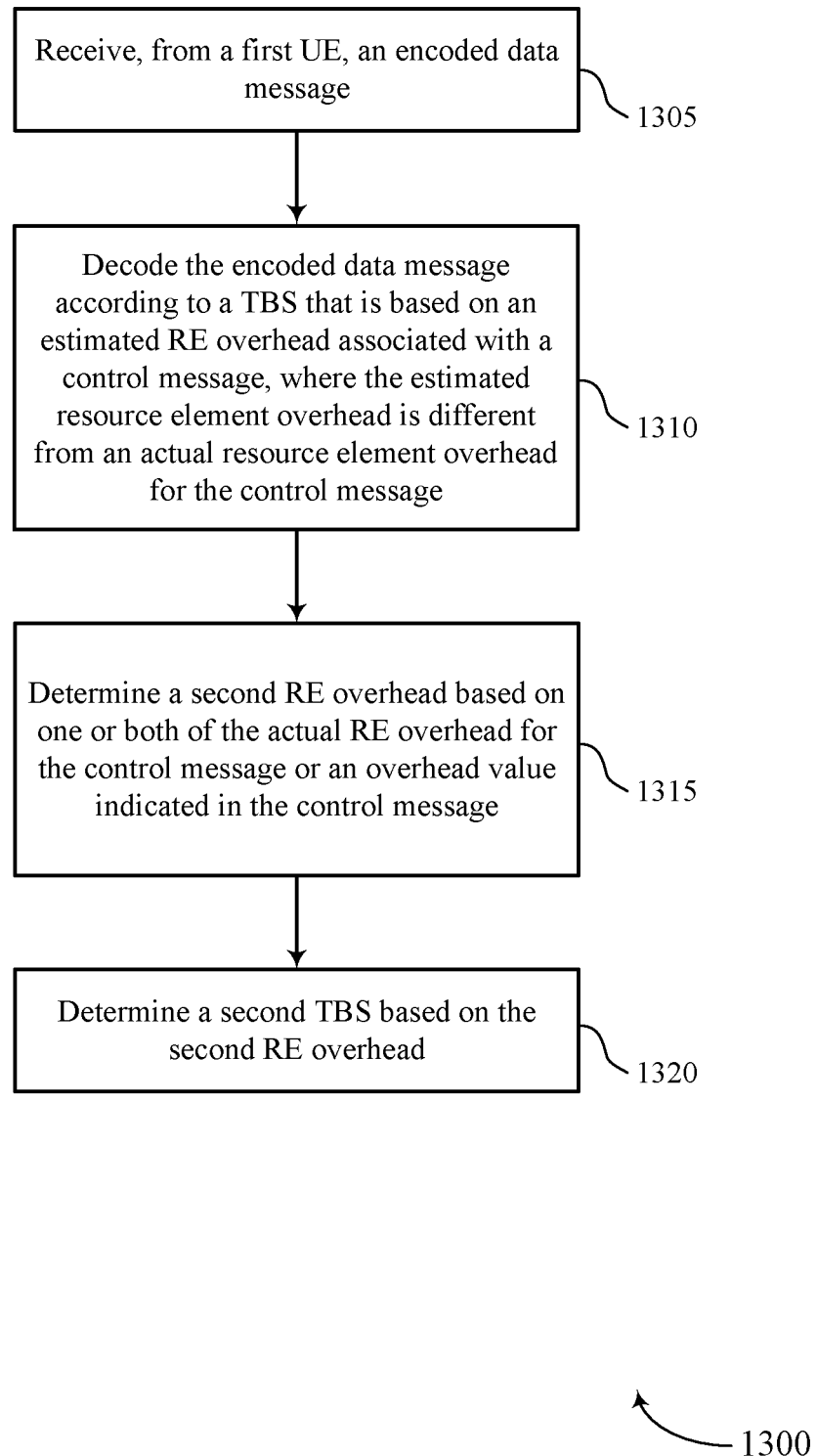

FIG. 13 shows a flowchart illustrating a method 1300 that supports TBS determination for two stage control in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a first UE, an encoded data message. The operations of 1305 may be performed according to the methods described herein. In some examples, aspects of the operations of 1305 may be performed by a two stage control manager as described with reference to FIGS. 5 through 8.

At 1310, the UE may decode the encoded data message according to a TBS that is based on an estimated RE overhead, where the estimated resource element overhead is different from an actual resource element overhead for the control message. The operations of 1310 may be performed according to the methods described herein. In some examples, aspects of the operations of 1310 may be performed by a decoding manager as described with reference to FIGS. 5 through 8.

At 1315, the UE may determine a second RE overhead based on one or both of the actual RE overhead for the control message or an overhead value indicated in the control message. The operations of 1315 may be performed according to the methods described herein. In some examples, aspects of the operations of 1315 may be performed by an overhead manager as described with reference to FIGS. 5 through 8.

At 1320, the UE may determine a second TBS based on the second RE overhead. The operations of 1320 may be performed according to the methods described herein. In some examples, aspects of the operations of 1320 may be performed by a TBS manager as described with reference to FIGS. 5 through 8.

Figure 14:
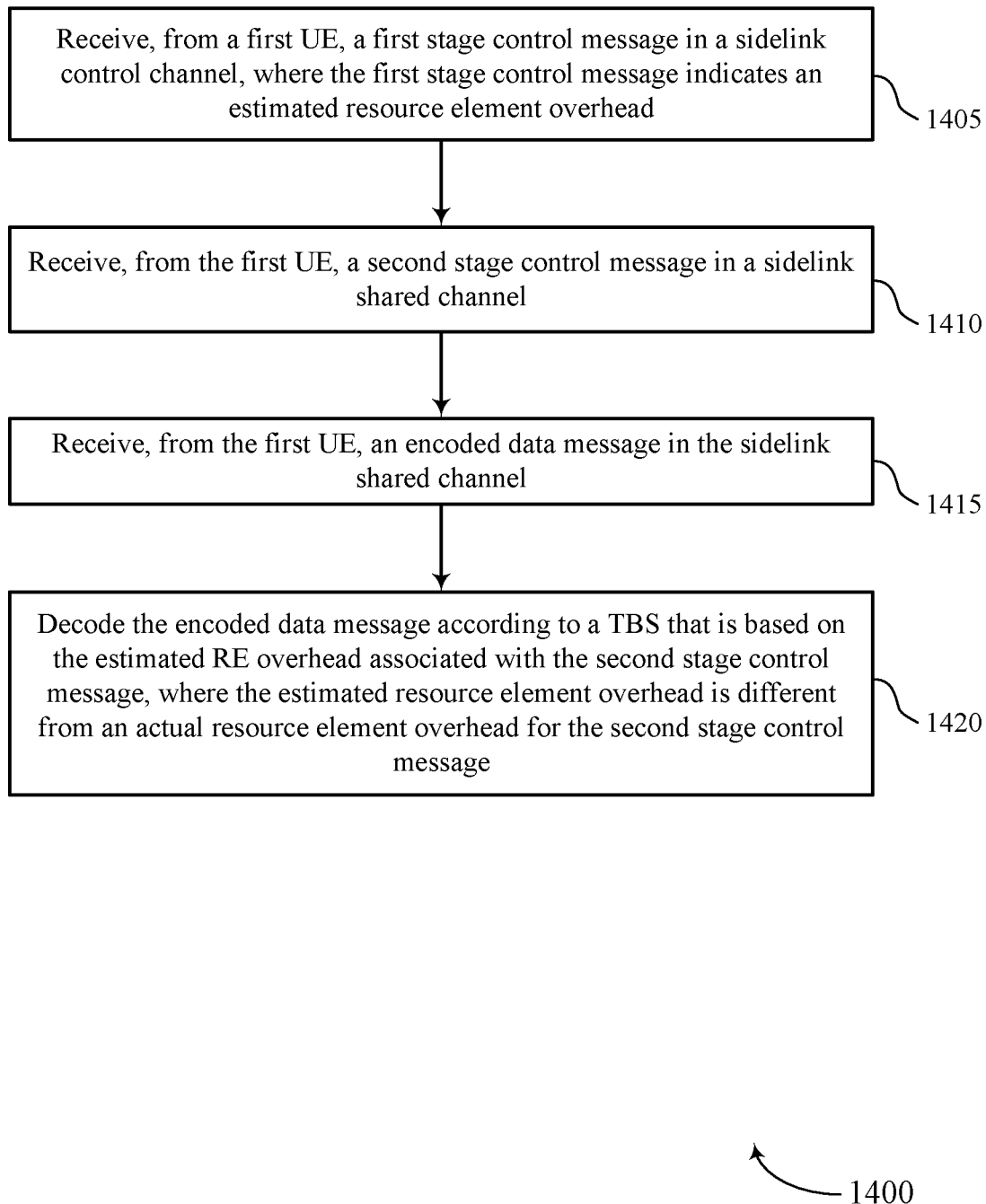

FIG. 14 shows a flowchart illustrating a method 1400 that supports TBS determination for two stage control in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a first UE, a first stage control message in a sidelink control channel, where the first stage control message indicates an estimated resource element overhead. The operations of 1405 may be performed according to the methods described herein. In some examples, aspects of the operations of 1405 may be performed by a two stage control manager as described with reference to FIGS. 5 through 8 (e.g., using a receiver or transceiver).

At 1410, the UE may receive, from the first UE, a second stage control message in a sidelink shared channel. The operations of 1410 may be performed according to the methods described herein. In some examples, aspects of the operations of 1410 may be performed by a two stage control manager as described with reference to FIGS. 5 through 8 (e.g., using the receiver or transceiver).

At 1415, the UE may receive, from the first UE, an encoded data message in the sidelink shared channel. The operations of 1415 may be performed according to the methods described herein. In some examples, aspects of the operations of 1415 may be performed by a two stage control manager as described with reference to FIGS. 5 through 8 (e.g., using the receiver or transceiver).

At 1420, the UE may decode the encoded data message according to a TBS that is based on the estimated RE overhead associated with the second stage control message, where the estimated resource element overhead is different from an actual resource element overhead for the second stage control message. The operations of 1420 may be performed according to the methods described herein. In some examples, aspects of the operations of 1420 may be performed by a two stage control manager as described with reference to FIGS. 5 through 8 (e.g., using the receiver or transceiver).

The following examples are given by way of illustration. Aspects of the following examples may be combined with aspects shown or discussed in relation to the figures or elsewhere herein.

The following provides an overview of aspects of the present disclosure:

Aspect 1: A method for wireless communications at a first UE, including: encoding a data message according to a TBS that is based at least in part on an estimated RE overhead associated with a control message, where the estimated RE overhead is different from an actual RE overhead for the control message; and transmitting, to a second UE, the encoded data message.

Aspect 2: The method of aspect 1, where the control message and the encoded data message are transmitted in a sidelink shared channel.

Aspect 3: The method of any of aspects 1 or 2, where the control message schedules transmission of the encoded data message.

Aspect 4: The method of any of aspects 1 through 3, where the estimated RE overhead is defined per PRB or per channel.

Aspect 5: The method of any of aspects 1 through 4, where the TBS includes a first TBS and the method further includes: determining a second RE overhead based at least in part on one or both of the actual RE overhead for the control message or an overhead value indicated in the control message; and determining a second TBS based at least in part on the second RE overhead.

Aspect 6: The method of aspect 5, where determining the second TBS further includes: determining a number of available REs for a sidelink shared channel; and subtracting the second RE overhead from the number of available REs to obtain an updated number of available REs for the sidelink shared channel, where the second TBS is determined based at least in part on the updated number of available REs.

Aspect 7: The method of any of aspects 1 through 6, where the estimated RE overhead includes a pre-configured value.

Aspect 8: The method of any of aspects 1 through 6, where the control message includes a second stage control message, the method further including: transmitting, to the second UE, a first stage control message in a sidelink control channel, where the first stage control message indicates the estimated RE overhead; and transmitting, to the second UE, the second stage control message in a sidelink shared channel.

Aspect 9: The method of any of aspects 1 through 8, where encoding the data message further includes: determining a number of modulation symbols for the control message based at least in part on the TBS, where the data message is encoded according to the number of modulation symbols.

Aspect 10: A method for wireless communications at a second UE, including: receiving, from a first UE, an encoded data message; and decoding the encoded data message according to a TBS that is based at least in part on an estimated RE overhead associated with a control message, where the estimated RE overhead is different from an actual RE overhead for the control message.

Aspect 11: The method of aspect 10, where the control message and the encoded data message are received in a sidelink shared channel.

Aspect 12: The method of any of aspects 10 through 11, where the encoded data message is decoded based at least in part on information decoded from the control message.

Aspect 13: The method of any of aspects 10 through 12, where the estimated RE overhead is defined per physical resource block or per channel.

Aspect 14: The method of any of aspects 10 through 13, where the TBS includes a first TBS and the method further includes: determining a second RE overhead based at least in part on one or both of the actual RE overhead for the control message or an overhead value indicated in the control message; and determining a second TBS based at least in part on the second RE overhead.

Aspect 15: The method of aspect 14, where determining the second TBS further includes: determining a number of available REs for a sidelink shared channel; and subtracting the second RE overhead from the number of available REs to obtain an updated number of available REs for the sidelink shared channel, where the second TBS is determined based at least in part on the updated number of available REs.

Aspect 16: The method of any of aspects 10 through 15, where the estimated RE overhead includes a pre-configured value.

Aspect 17: The method of any of aspects 10 through 15, where the control message includes a second stage control message, the method further including: receiving, from the first UE, a first stage control message in a sidelink control channel, where the first stage control message indicates the estimated RE overhead; and receiving, from the first UE, the second stage control message in a sidelink shared channel.

Aspect 18: The method of any of aspects 10 through 17, where decoding the encoded data message further includes: determining a number of modulation symbols for the control message based at least in part on the TBS, where the encoded data message is decoded according to the number of modulation symbols.

Aspect 19: A system or an apparatus for wireless communications at a first UE, including one or more processors; memory coupled with the one or more processors; and instructions stored in the memory and executable by the one or more processors to cause the system or apparatus to implement a method as in any of aspects 1 through 9.

Aspect 20: A system or an apparatus for wireless communications at a first UE, including at least one means for implementing a method or realizing an apparatus as in of any of aspects 1 through 9.

Aspect 21: A non-transitory computer-readable medium storing code for wireless communications at a first UE, the code including instructions executable by one or more processors to cause the one or more processors to implement a method as in any of aspects 1 through 9.

Aspect 22: A system or an apparatus for wireless communications at a second UE, including one or more processors; memory coupled with the one or more processors; and instructions stored in the memory and executable by the one or more processors to cause the system or apparatus to implement a method as in any of aspects 10 through 18.

Aspect 23: A system or an apparatus for wireless communications at a second UE, including at least one means for implementing a method or realizing an apparatus as in any of aspects 10 through 18.

Aspect 24: A non-transitory computer-readable medium storing code for wireless communications at a second UE, the code including instructions executable by one or more processors to cause the one or more processors to implement a method as in any of aspects 10 through 18.

Aspects of these examples may be combined with aspects or embodiments disclosed in other implementations. Further, it should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
    transmitting, to a second UE, a first stage control message via a sidelink control channel;
    encoding a data message according to a transport block size that is based at least in part on an estimated resource element overhead associated with a second stage control message, wherein the estimated resource element overhead is different from an actual resource element overhead for the second stage control message, and wherein the estimated resource element overhead is calculated based at least in part on a quantity of information bits for the second stage control message, a quantity of error correction bits for the second stage control message, and a predetermined value associated with the second stage control message; and
    transmitting, to the second UE, the encoded data message and the second stage control message via a sidelink shared channel.

2. The method of claim 1, wherein the second stage control message schedules a transmission of the encoded data message.

3. The method of claim 1, wherein the estimated resource element overhead is defined per physical resource block or per channel.

4. The method of claim 1, wherein the transport block size comprises a first transport block size and the method further comprises:
    determining a second resource element overhead based at least in part on one or both of the actual resource element overhead for the second stage control message or an overhead value indicated in the second stage control message; and
    determining a second transport block size based at least in part on the second resource element overhead.

5. The method of claim 4, wherein determining the second transport block size further comprises:
    determining a number of available resource elements for the sidelink shared channel; and
    subtracting the second resource element overhead from the number of available resource elements to obtain an updated number of available resource elements for the sidelink shared channel, wherein the second transport block size is determined based at least in part on the updated number of available resource elements.

6. The method of claim 1, wherein the first stage control message indicates the estimated resource element overhead.

7. The method of claim 1, wherein encoding the data message further comprises:
    determining a number of modulation symbols for the second stage control message based at least in part on the transport block size, wherein the data message is encoded according to the number of modulation symbols.

8. A method for wireless communications at a second user equipment (UE), comprising:
    receiving, from a first UE, a first stage control message via a sidelink control channel;
    receiving, from the first UE, an encoded data message and a second stage control message via a sidelink shared channel; and
    decoding the encoded data message according to a transport block size that is based at least in part on an estimated resource element overhead associated with the second stage control message, wherein the estimated resource element overhead is different from an actual resource element overhead for the second stage control message, and wherein the estimated resource element overhead is calculated based at least in part on a quantity of information bits for the second stage control message, a quantity of error correction bits for the second stage control message, and a predetermined value associated with the second stage control message.

9. The method of claim 8, wherein the encoded data message is decoded based at least in part on information decoded from the second stage control message.

10. The method of claim 8, wherein the estimated resource element overhead is defined per physical resource block or per channel.

11. The method of claim 8, wherein the transport block size comprises a first transport block size and the method further comprises:
    determining a second resource element overhead based at least in part on one or both of the actual resource element overhead for the second stage control message or an overhead value indicated in the second stage control message; and
    determining a second transport block size based at least in part on the second resource element overhead.

12. The method of claim 11, wherein determining the second transport block size further comprises:
- determining a number of available resource elements for the sidelink shared channel; and
- subtracting the second resource element overhead from the number of available resource elements to obtain an updated number of available resource elements for the sidelink shared channel, wherein the second transport block size is determined based at least in part on the updated number of available resource elements.

13. The method of claim 8, wherein the first stage control message indicates the estimated resource element overhead.

14. The method of claim 8, wherein decoding the encoded data message further comprises:
- determining a number of modulation symbols for the second stage control message based at least in part on the transport block size, wherein the encoded data message is decoded according to the number of modulation symbols.

15. A first user equipment (UE), comprising:
- one or more memories storing processor-executable code; and
- one or more processors coupled with the one or more memories and configured to execute the code to cause the first UE to:
  - transmit, to a second UE, a first stage control message via a sidelink control channel;
  - encode a data message according to a transport block size that is based at least in part on an estimated resource element overhead associated with a second stage control message, wherein the estimated resource element overhead is different from an actual resource element overhead for the second stage control message, and wherein the estimated resource element overhead is calculated based at least in part on a quantity of information bits for the second stage control message, a quantity of error correction bits for the second stage control message, and a predetermined value associated with the second stage control message; and
  - transmit, to a second UE, the encoded data message and the second stage control message via a sidelink shared channel.

16. The first UE of claim 15, wherein the second stage control message schedules a transmission of the encoded data message.

17. The first UE of claim 15, wherein the estimated resource element overhead is defined per physical resource block or per channel.

18. The first UE of claim 15, wherein the first stage control message indicates the estimated resource element overhead.

19. A second user equipment (UE), comprising:
- one or more memories storing processor-executable code; and
- one or more processors coupled with the one or more memories and configured to execute the code to cause the second UE to:
  - receive, from a first UE, a first stage control message via a sidelink control channel;
  - receive, from the first UE, an encoded data message and a second stage control message via a sidelink shared channel; and
  - decode the encoded data message according to a transport block size that is based at least in part on an estimated resource element overhead associated with the second stage control message, wherein the estimated resource element overhead is different from an actual resource element overhead for the second stage control message, and wherein the estimated resource element overhead is calculated based at least in part on a quantity of information bits for the second stage control message, a quantity of error correction bits for the second stage control message, and a predetermined value associated with the second stage control message.

20. The second UE of claim 19, wherein the encoded data message is decoded based at least in part on information decoded from the second stage control message.

21. The second UE of claim 19, wherein the estimated resource element overhead is defined per physical resource block or per channel.

22. The second UE of claim 19, wherein the first stage control message indicates the estimated resource element overhead.

* * * * *